US007663081B2

(12) United States Patent
Hahn et al.

(10) Patent No.: US 7,663,081 B2
(45) Date of Patent: Feb. 16, 2010

(54) APPARATUS FOR DIGITAL IMAGING PHOTODETECTOR USING GAS ELECTRON MULTIPLIER

(75) Inventors: Chang Hie Hahn, 109-1308, Hyundai Apt., Banrim-dong, Changwon City, Gyeongsangnam-do (KR) 641-767; Il-Gon Kim, Gyeongsangnam-do (KR); Won-Jeong Kim, Gyeongsangnam-do (KR); Jaehoon Yu, Arlington, TX (US)

(73) Assignee: Chang Hie Hahn, Changwon (KR)

( * ) Notice: Subject to any disclaimer, the term of this patent is extended or adjusted under 35 U.S.C. 154(b) by 0 days.

(21) Appl. No.: 12/094,985

(22) PCT Filed: Nov. 23, 2006

(86) PCT No.: PCT/KR2006/004949

§ 371 (c)(1),
(2), (4) Date: May 23, 2008

(87) PCT Pub. No.: WO2007/061235

PCT Pub. Date: May 31, 2007

(65) Prior Publication Data

US 2008/0283725 A1 Nov. 20, 2008

(30) Foreign Application Priority Data

Nov. 23, 2005 (KR) ...................... 10-2005-0112400

(51) Int. Cl.
*G01T 1/18* (2006.01)

(52) U.S. Cl. ...................................... 250/207; 250/374

(58) Field of Classification Search ................. 250/207, 250/374, 385.1; 378/98.2
See application file for complete search history.

(56) References Cited

U.S. PATENT DOCUMENTS

| | | | | |
|---|---|---|---|---|
| 5,192,861 | A | 3/1993 | Breskin et al. | |
| 6,011,265 | A | 1/2000 | Sauli | |
| 7,332,726 | B2 * | 2/2008 | Friedman et al. | 250/374 |
| 7,410,606 | B2 * | 8/2008 | Appleby et al. | 264/219 |
| 7,411,204 | B2 * | 8/2008 | Appleby et al. | 250/505.1 |
| 7,518,119 | B2 * | 4/2009 | Friedman et al. | 250/374 |
| 7,564,039 | B1 * | 7/2009 | Friedman et al. | 250/374 |

FOREIGN PATENT DOCUMENTS

JP 2005-010163 A 1/2005

* cited by examiner

*Primary Examiner*—Seung C Sohn

(57) ABSTRACT

The present invention provides a digital imaging photodetector with a gas electron multiplier. The digital imaging photodetector comprises a gas electron multiplier detector. The gas electron multiplier detector includes a photoelectric converter for converting incident light into photoelectrons or Compton electrons; a gas electron multiplier (GEM) for receiving the photoelectrons or Compton electrons from the photoelectric converter and multiplying them; and a readout unit for receiving an electrical signal indicating a position where an electron cloud multiplied in the gas electron multiplier arrives on an anode, recognizing coordinates of the electron cloud based on the received signal, and outputting the coordinates of the electron cloud. According to the digital imaging photodetector of the present invention, real-time imaging of image information can be achieved by multiplying photoelectrons or Compton electrons, which are discharged due to a photoelectric effect or a Compton effect induced by visible rays, ultraviolet rays or X-rays, using the gas electron multiplier.

53 Claims, 14 Drawing Sheets

APPARATUS FOR DIGITAL IMAGING PHOTODETECTOR USING GAS ELECTRON MULTIPLIER

CROSS-REFERENCES TO RELATED APPLICATIONS

This is a U.S. National Phase of International Application PCT/KR2006/004949, which was filed Nov. 23, 2006, and claims the benefit of priority of Republic of Korea patent application number 10-2005-0112400, filed Nov. 23, 2005, both applications being hereby incorporated by reference herein in their entireties.

INTRODUCTION

The present invention relates to a digital imaging photodetector with a gas electron multiplier (GEM), and more particularly, to a digital imaging photodetector with a gas electron multiplier, wherein real-time imaging of image information can be achieved by multiplying photoelectrons or Compton electrons, which are discharged due to a photoelectric effect or a Compton effect induced by visible rays, ultraviolet rays or X-rays, using the gas electron multiplier.

BACKGROUND

In general, gas electron multiplier technology was developed by F. Sauli, R. D. Oliveira, et al. in the Gas Detector Development Group of the European Organization for Nuclear Research (CERN) for the purpose of detecting high-energy elementary particles in 1997. Although the technology has high potential applicability and accordingly has been variously studied by international advanced research groups, studies on its applications are at an early stage.

In particular, a gas exhibits a relatively higher photoelectric effect and Compton effect with respect to X-rays and γ-rays ranging from several keV to several hundreds keV, and a GEM detector has superior spatial and temporal resolutions. Accordingly, fundamental studies on medical high-quality imaging technology for GEM-based real-time X-ray imaging are actively conducted at present. Advantages of the GEM include low production costs, superior stability, light weight, small thickness, and good flexibility.

Since a GEM detector detects X-rays and γ-rays, or charged particles by ionizing a gas, it features solving disadvantages of a charge coupled device (CCD) that has high operating efficiency only in a visible ray range. In addition, the GEM detector has a wide range of applications since it is effective for measurement of charged particles and can be used as a neutron detector by adding $BF_3$ to a gas in the GEM detector or coating a GEM foil with a neutron stopping material such as boron.

However, studies on applications of the GEM detector are yet at an early stage, and real-time digital imaging technology for visible ray image information on a planar or three-dimensional image by means of multiplication of photoelectrons or Compton electrons due to incident rays using a gas electron multiplier has not yet been developed.

SUMMARY

The present invention is conceived to solve the aforementioned problems in the prior art. Accordingly, an object of the present invention is to provide a digital imaging photodetector with a gas electron multiplier, wherein real-time imaging of image information can be achieved by multiplying photoelectrons or Compton electrons, which are discharged due to a photoelectric effect or a Compton effect induced by visible rays, ultraviolet rays or X-rays, using the gas electron multiplier.

To achieve the object, a digital imaging photodetector with a gas electron multiplier according to an embodiment of the present invention comprises a gas electron multiplier detector which includes a photoelectric converter for converting incident light into photoelectrons or Compton electrons, a gas electron multiplier (GEM) for receiving the photoelectrons or Compton electrons from the photoelectric converter and multiplying them, and a readout unit for receiving an electrical signal indicating a position where an electron cloud multiplied in the gas electron multiplier arrives on an anode, recognizing coordinates of the electron cloud based on the received signal, and outputting the coordinates of the electron cloud.

As described below, the digital imaging photodetector with a gas electron multiplier according to the present invention is to detect light in a wavelength region from visible rays to X-rays (50 nm to 850 nm). The digital imaging photodetector has an advantage in that real-time imaging of image information can be achieved by multiplying photoelectrons or Compton electrons, which are discharged due to a photoelectric effect or a Compton effect induced by visible rays, ultraviolet rays or X-rays, using the gas electron multiplier.

In addition, since the photodetector of the present invention uses a micro printed circuit board (MPCB), it apparently does not require a tube and a Dynode and has superior performance, a smaller thickness, and more convenience of use as compared with conventional products. Accordingly, the photodetector of the present invention is expected to substitute for demands for a photomultiplier tube (PMT) that is widely used in a relevant industry, and to create a new paradigm of a next-generation lightweight, slim, short and small photodetector.

According to the present invention, it is possible to manufacture a laser-based superprecision position detector more conveniently and at low costs. The photodetector of the present invention is expected to obtain effects of high value added technology, such as applications to a night fluoroscope for military personnel or military equipment such as tanks, medical X-ray real-time imaging devices, a densitometer for measuring a density difference in an X-ray film, and the like. Further, the photodetector of the present invention can be widely used as photodetectors for an industrial non-destructive tester, an X-ray astronomical telescope, an X-ray microscope, an X-ray polariscope, plasma diagnosis control equipment, and the like. If the photodetector of the present invention is applied to the plasma diagnosis control equipment, it can be used in Korean nuclear fusion reactors.

A charge coupled device (CCD) has a relatively excellent spatial resolution of several micrometers but a somewhat poor temporal resolution of several milliseconds, while the GEM detector according to the present invention has advantages of a similar spatial resolution and a more excellent temporal resolution of several nanoseconds. The present invention can also solve a problem with high-voltage operation of a plasma display panel (PDP) and may substitute for the PDP if the present invention is implemented more specifically.

Further, the present invention can be used as a position detection element by being applied to a position sensitive detector (PSD) for detecting the position of projected light. All of a photodiode, an array, a linear image sensor, an area image sensor and the like used for detecting a position are divisional and discontinuous types, whereas the PSD is a non-divisional type and thus can obtain continuous position information. In particular, the PSD must have appropriate detection characteristics. Since the photodetector of the present invention has all detection characteristics required for the PSD, it is suitable for a position detection element. Such a PSD is widely used for measurement of a position or angle in an optical device, optical remote control, installation and control of a machining tool, analysis and monitoring of deformation or vibration of an object, alignment of an optical axis of a laser device, medical instruments, and the like in various industrial fields, and is also used for auto focusing of a video camera in a household appliance field.

Furthermore, the present invention is applicable to laser-based superprecision measurement technology having several superior characteristics that enable the highest decision measurement. The present invention has a variety of characteristics including non-contact measurement, local measurement, high-sensitivity measurement, high-speed measurement, absence of interference, and high stability. Thus, the present invention is applicable to different industrial fields.

DETAILED DESCRIPTION

Hereinafter, an embodiment of a digital imaging photodetector with a gas electron multiplier according to the technical spirit of the present invention will be described with reference to the accompanying drawings.

Figure 1:
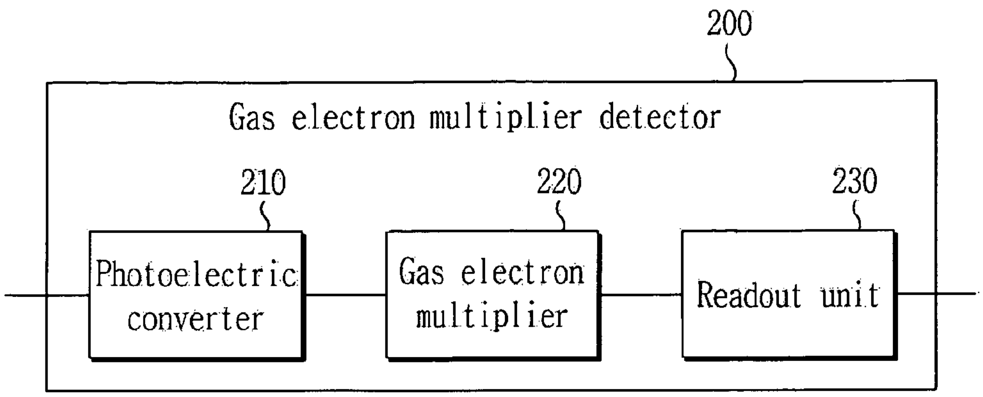
FIG. 1 is a block diagram illustrating the configuration of a digital imaging photodetector with a gas electron multiplier according to an embodiment of the present invention.

FIG. 1 is a block diagram illustrating the configuration of a digital imaging photodetector with a gas electron multiplier according to an embodiment of the present invention. As shown in the figure, a gas electron multiplier detector 200 includes a photoelectric converter 210 for converting incident light into photoelectrons or Compton electrons; a gas electron multiplier 220 for receiving the photoelectrons or Compton electrons from the photoelectric converter 210 and multiplying them; and a readout unit 230 for receiving an electrical signal indicating a position where an electron cloud multiplied in the gas electron multiplier 220 arrives on an anode, recognizing the coordinates of the electron cloud based on the received signal, and outputting the coordinates of the electron cloud.

Figure 2:
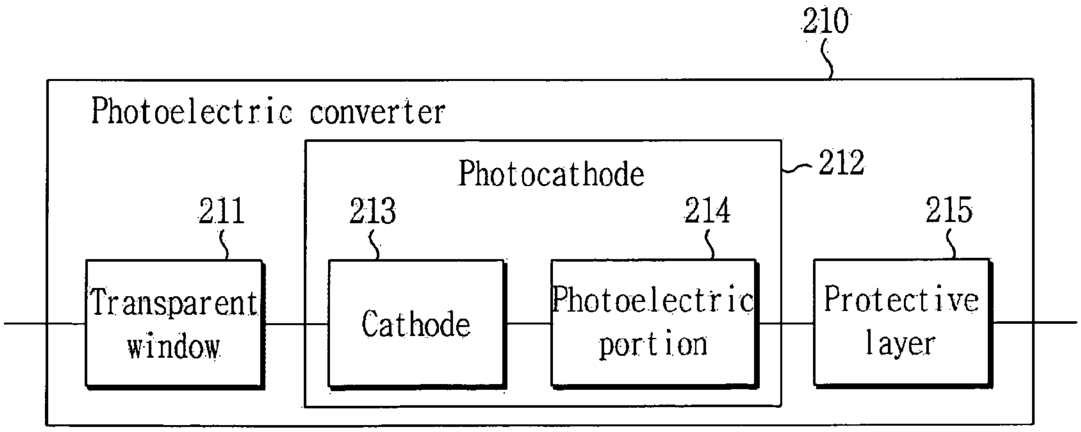
FIG. 2 is a block diagram illustrating the configuration of an example of a photoelectric converter in FIG. 1.

FIG. 2 is a block diagram illustrating the configuration of an example of the photoelectric converter in FIG. 1. As shown in the figure, the photoelectric converter 210 comprises a transparent window 211 for transmitting or blocking the incident light according to a detection purpose; a photocathode 212 at which the incident light transmitted through the transparent window 211 arrives; and a protective layer 215 formed of a protective-layer material coated on the photocathode 212 for stably maintaining the lifetime of the photocathode 212 even though ions collide therewith while a photoelectric material operates in a gas.

The transparent window 211 is made of a material, such as quartz, capable of transmitting light therethrough and preventing leakage of the internal gas. The transparent window 211 has a thickness enough to withstand a pressure difference between the interior and the exterior thereof or external pressure without crushing.

The photocathode 212 comprises a cathode 213 at which the incident light transmitted through the transparent window 211 arrives and which has an electrode material coated thereon; and a photoelectric portion 214 formed by coating a primary photoelectric material, which well reacts with photons having wavelengths in a detection range, on the cathode 213.

The cathode 213 is coated with the electrode material that is at least one selected from the group consisting of copper, aluminum, gold and platinum. The cathode 213 is coated with the electrode material to a thickness of 1 to 50 nm.

The photoelectric portion 214 is formed of a coating of the photoelectric material that is at least one selected from the group consisting of CsTe, Bialkali (Cs—Sb based) and Multialkali (K—Cs—Sb based). The photoelectric portion 214 is formed by coating the photoelectric material to a thickness of 1 to 100 nm.

The protective layer 215 is formed of a coating of the protective-layer material that is at least one selected from the group consisting of CsI and CsBr. The protective layer 215 is formed by coating the protective-layer material to a thickness of 1 to 100 nm.

The cathode 213 of the photocathode 212 and the protective layer 215 have a work function that is set to be greater than a work function of the photoelectric portion 214 of the photocathode 212 and than energy of photons to be detected. One or more of the transparent window 211, the photocathode 212, and the protective layer 215 of the photoelectric converter 210 are deposited by means of at least one of sputtering and pulsed laser deposition.

Figure 3:
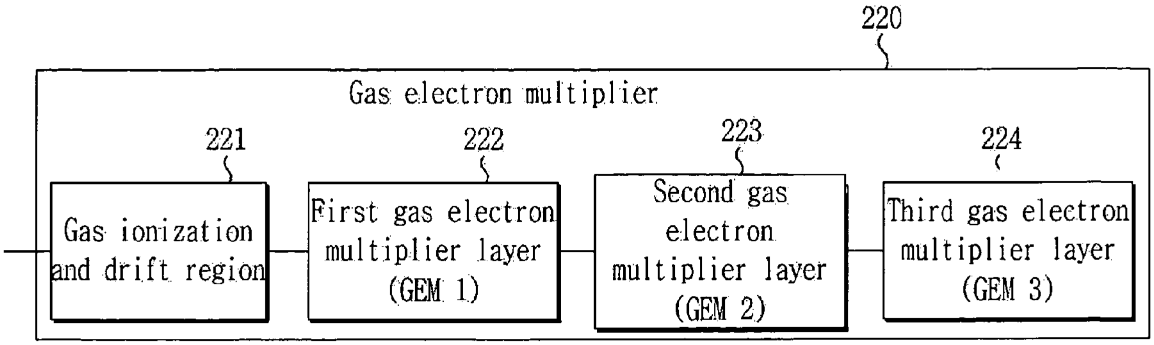
FIG. 3 is a block diagram illustrating the configuration of an example of a gas electron multiplier in FIG. 1.

FIG. 3 is a block diagram illustrating the configuration of an example of the gas electron multiplier in FIG. 1. As shown in the figure, the gas electron multiplier (GEM) 220 includes three GEM layers.

The gas electron multiplier 220 includes a gas ionization and drift region 221 that receives and multiplies the photoelectrons or Compton electrons converted by the photoelectric converter 210, is configured with a selected gas suitable for a wavelength of light to be detected and the photocathode 212 of the photoelectric converter 210, accelerates the received photoelectrons or Compton electrons with low energy, and ionizes the gas using the accelerated photoelectrons or Compton electrons; a first GEM layer (GEM1) 222 for accelerating electrons ionized by the gas ionization and drift region 221 and multiplying the number of the electrons with a certain multiplication by means of an electron avalanche; a second GEM layer (GEM2) 223 for accelerating the electrons primarily multiplied by the first GEM layer 222 and additionally multiplying the number of the electrons with a certain multiplication by means of an electron avalanche; and a third GEM layer (GEM3) 224 for additionally multiplying the electrons multiplied by the second GEM layer 222 and delivering them to the readout unit 230.

The gas ionization and drift region 221 accepts the photoelectrons or Compton electrons generated from the photoelectric converter 210, ionizes the gas filled therein (e.g., a main inert gas and a polyatomic quenching gas) using the accepted photoelectrons or Compton electrons, quickly moves the ionized electrons to the first GEM layer 222, and slowly moves cations to the photocathode 212.

In the gas ionization and drift region 221, the ionized main gas (e.g., inert gas) collides with a small amount of quenching gas (organic polyatomic gas) before colliding with the photocathode so that energy generated upon return of the ionized main gas to a neutral gas can be imparted to the quenching gas so as to ionize the quenching gas. The ionized gas is coupled with free electrons by colliding with the photocathode. As a result, the gas is returned to an original state while ultraviolet-ray emission is suppressed (subsequent ultraviolet-ray emission can be controlled by emitting energy in the form of vibration energy or decomposed energy components upon transition from an exited state to a ground state).

As for the ionized and quenching gases used in the gas ionization and drift region 221, a proper gas that can be decomposed into individual molecules even by means of continuous ionization due to ultraviolet rays generated in the gas electron multiplier detector 200 during the ionization or collision with the photocathode 212, thereby preventing the occurrence of discharge (Penning effect) is mixed with a gas capable of increasing a gain and having long lifetime so that the mixture fills the interior of the gas ionization and drift region 221, or with a gas having a rapid response time to improve a temporal resolution so that the mixture fills the interior of the gas ionization and drift region 221 at proper pressure.

A voltage applied to the gases used as the ionized and quenching gases allows the gas ionization and drift region 221 to operate in a proportion region. The gas electron multiplier 220 includes three sheets of gas electron multiplier foils having holes with a size of 10 to 75 μm and a center-to-center distance of 20 to 150 μm, and the holes have a matrix arrangement in which three neighboring holes are disposed in the form of a regular triangle.

The gas electron multiplier 220 comprises a first gas electron multiplier layer 222 that receives the photoelectrons or Compton electrons converted by the photoelectric converter 210, is configured with a selected gas suitable for the photocathode coated with the protective layer 215 in the photoelectric converter 210, rapidly accelerates electrons ionized by the received photoelectrons or Compton electrons with low energy, and ionizes the gas using the accelerated photoelectrons or Compton electrons by means of an electron avalanche in the holes of the gas electron multiplier so as to multiply the number of the electrons; a second gas electron multiplier layer 223 for accelerating the electrons multiplied by the first gas electron multiplier layer 222 and multiplying the number of the electrons with a certain multiplication by means of an electron avalanche; and a third gas electron multiplier layer 224 for additionally multiplying the electrons multiplied by the second gas electron multiplier layer 222 and delivering them to the readout unit 230.

The first gas electron multiplier layer 222 is configured such that a distance between the first gas electron multiplier layer 222 and the photoelectric converter 210 ranges from 0.1 mm to 10 mm. A potential difference between the first gas electron multiplier layer 222 and the photoelectric converter 210 allows the first gas electron multiplier layer 222 to operate in a proportion region.

The second gas electron multiplier layer 223 is configured such that a distance between the second gas electron multiplier layer 223 and the first gas electron multiplier layer 222 ranges from 0.1 mm to 10 mm. A potential difference between the second gas electron multiplier layer 223 and the first gas electron multiplier layer 222 allows the second gas electron multiplier layer 223 to operate in a proportion region.

The third gas electron multiplier layer 224 is configured such that a distance between the third gas electron multiplier layer 224 and the second gas electron multiplier layer 223 ranges from 0.1 mm to 10 mm. A potential difference between the third gas electron multiplier layer 224 and the second gas electron multiplier layer 223 allows the third gas electron multiplier layer 224 to operate in a proportion region.

The third gas electron multiplier layer 224 is configured such that a distance between the third gas electron multiplier layer 224 and the readout unit 230 ranges from 0.1 mm to 10 mm. A potential difference between the third gas electron multiplier layer 224 and the readout unit 230 allows the third gas electron multiplier layer 224 to operate in a proportion region.

A voltage of 100V to 10000V is applied to each of the first to third gas electron multiplier layers 222 to 224 in order to produce the electron avalanche.

Figure 4:
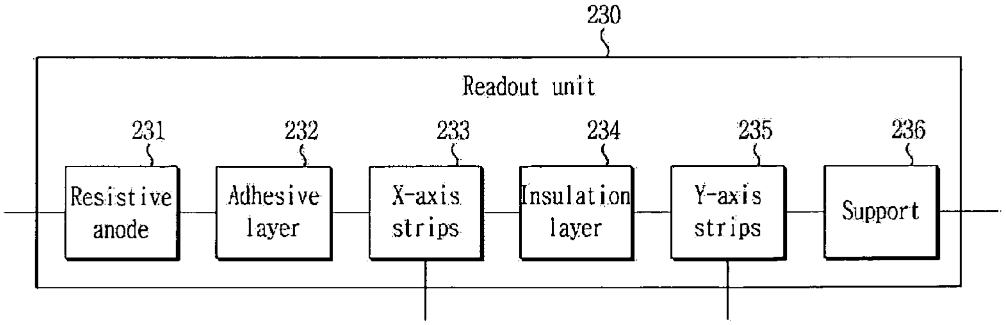
FIG. 4 is a block diagram illustrating the configuration of an example of a readout unit in FIG. 1.

FIG. 4 is a block diagram illustrating the configuration of an example of the readout unit in FIG. 1. As shown in the figure, the readout unit 230 comprises a micro printed circuit board (MPCB).

The readout unit 230 includes a resistive anode 231 for receiving the multiplied electrons as an electrical signal from the gas electron multiplier 220; an adhesive layer 232 for bonding the resistive anode 231 to X-axis strips 233; the X-axis strips 233 for distributing and outputting an electrical signal input via the resistive anode 231 along one axis; an insulation layer 234 for insulating the X-axis strips 233 and Y-axis strips 235 from each other; and the Y-axis strips 235 for distributing and outputting an electrical signal input via the resistive anode 231 along another axis.

The readout unit 230 further comprises a support 236 for supporting the resistive anode 231, the adhesive layer 232, the X-axis strips 233, the insulation layer 234, and the Y-axis strips 235.

Figure 5A:
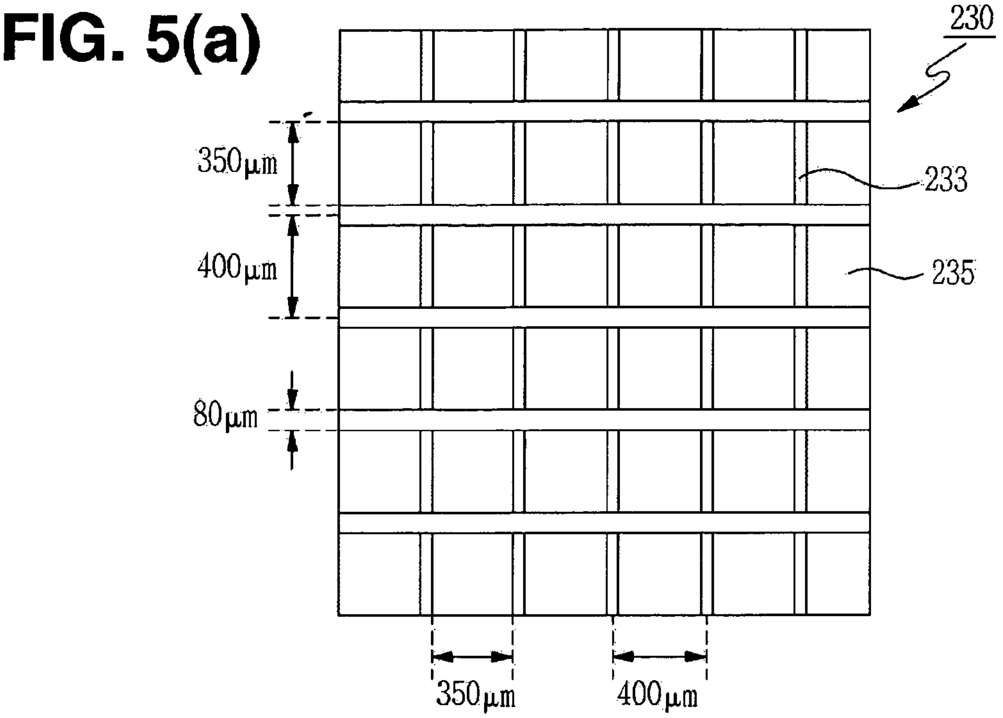
FIG. 5 is a schematic diagram illustrating an example of the configuration of the readout unit of FIG. 4.
Figure 5B:
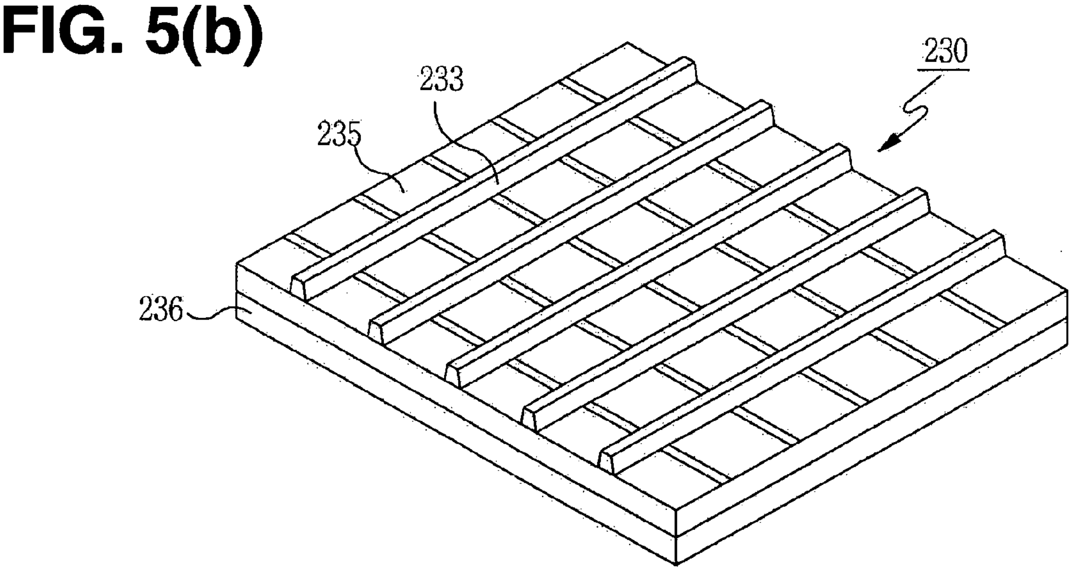

FIG. 5 is a schematic diagram illustrating an example of the configuration of the readout unit of FIG. 4. As shown in the figure, the resistive anode 231 is formed of a material having high surface resistance, such as a Mylar film (reinforced polyester film) or polyimide (Kapton). The adhesive layer 232 is formed to have a thickness of 10 μm to 100 μm. The X-axis strips 233 are formed to have a width of 10 μm to 200 μm.

The insulation layer 234 is formed of a material having high surface resistance, such as a Mylar film or polyimide (Kapton). The insulation layer 234 is formed to have a thickness of 10 μm to 100 μm. The Y-axis strips 235 are formed to have a width of 10 μm to 1000 μm.

The readout unit 230 comprises a screen (including P20, P22, P46) doped with a phosphor or fluorescent material, and recognizes and outputs planar coordinates by detecting light emitted upon occurrence of the electron avalanche in the gas electron multiplier 220.

The readout unit 230 recognizes and outputs planar coordinates by detecting, using a CCD camera, light emitted upon occurrence of the electron avalanche in the gas electron multiplier 220. The readout unit 230 is configured by at least one selected from the group consisting of applicable specific integrated circuit (ASIC) readout electronics, resistive anode readout electronics, pad or strip anode electronics, delay-line anode readout electronics, microstrip gas chamber (MSGC) readout electronics, and scintillation readout electronics.

Figure 6:
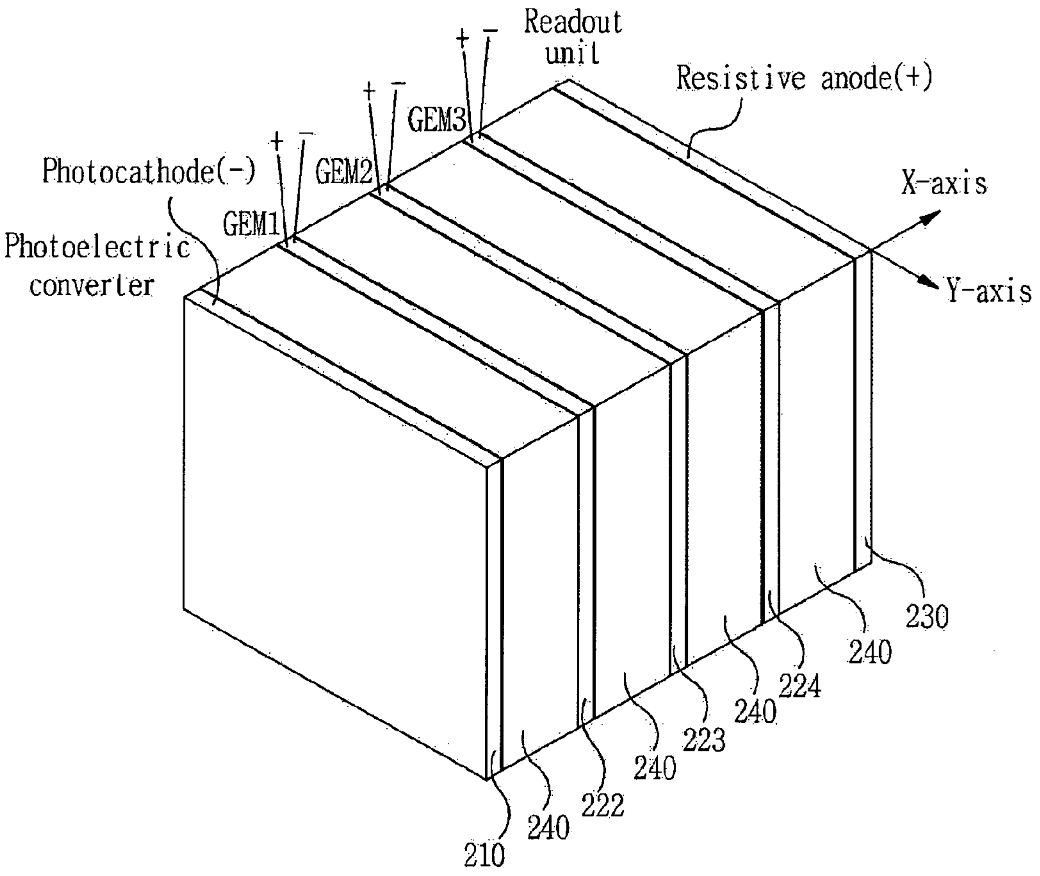
FIG. 6 is a perspective view illustrating an example of a housing of a gas electron multiplier detector in FIG. 1.
Figure 7:
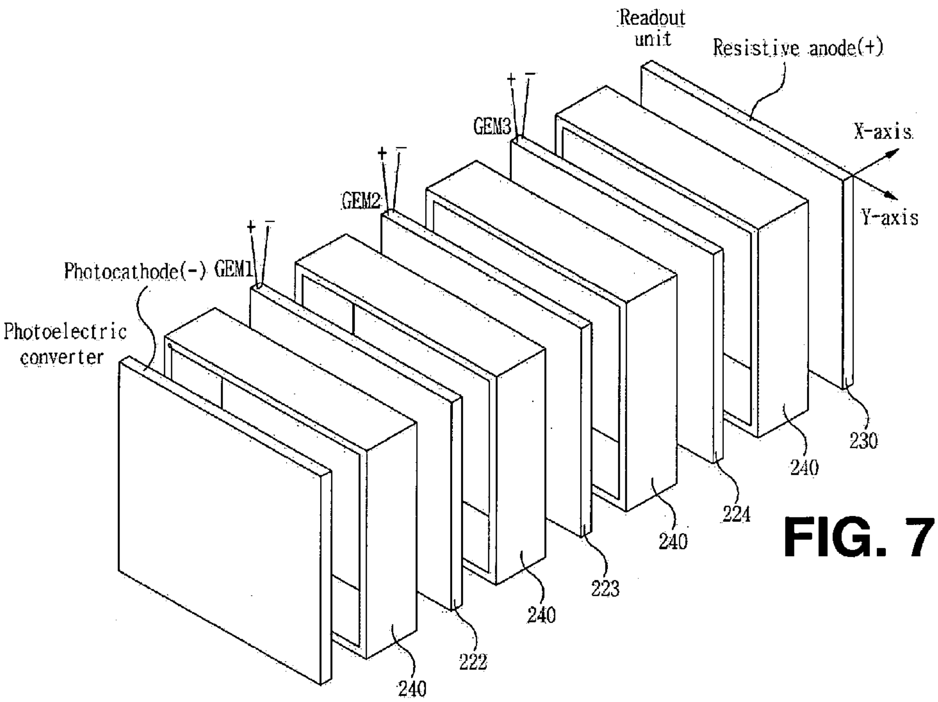
FIG. 7 is an exploded perspective view of FIG. 6.
Figure 8:
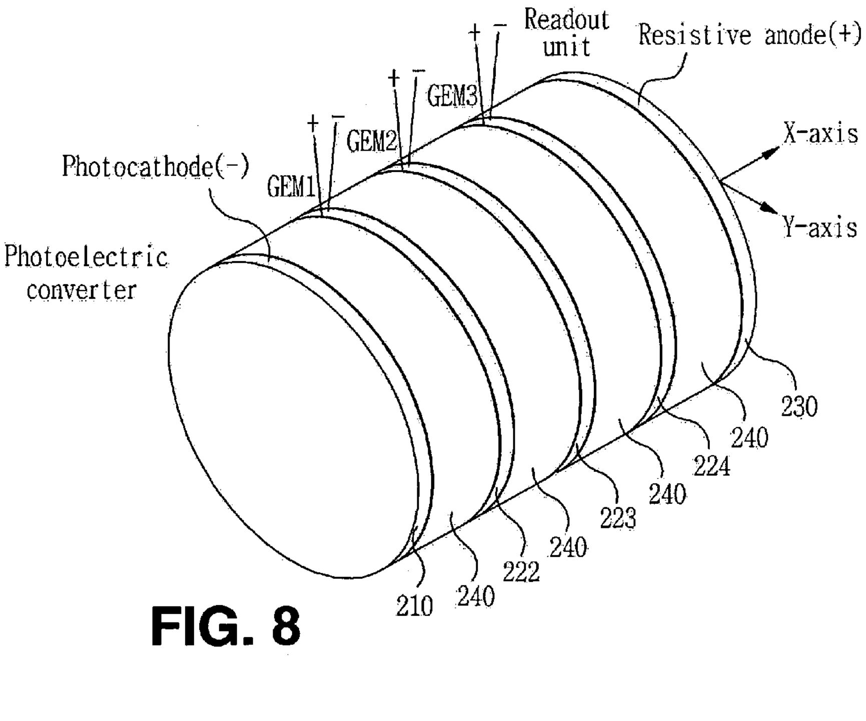
FIG. 8 is a perspective view illustrating another example of the housing of the gas electron multiplier detector in FIG. 1.
Figure 9:
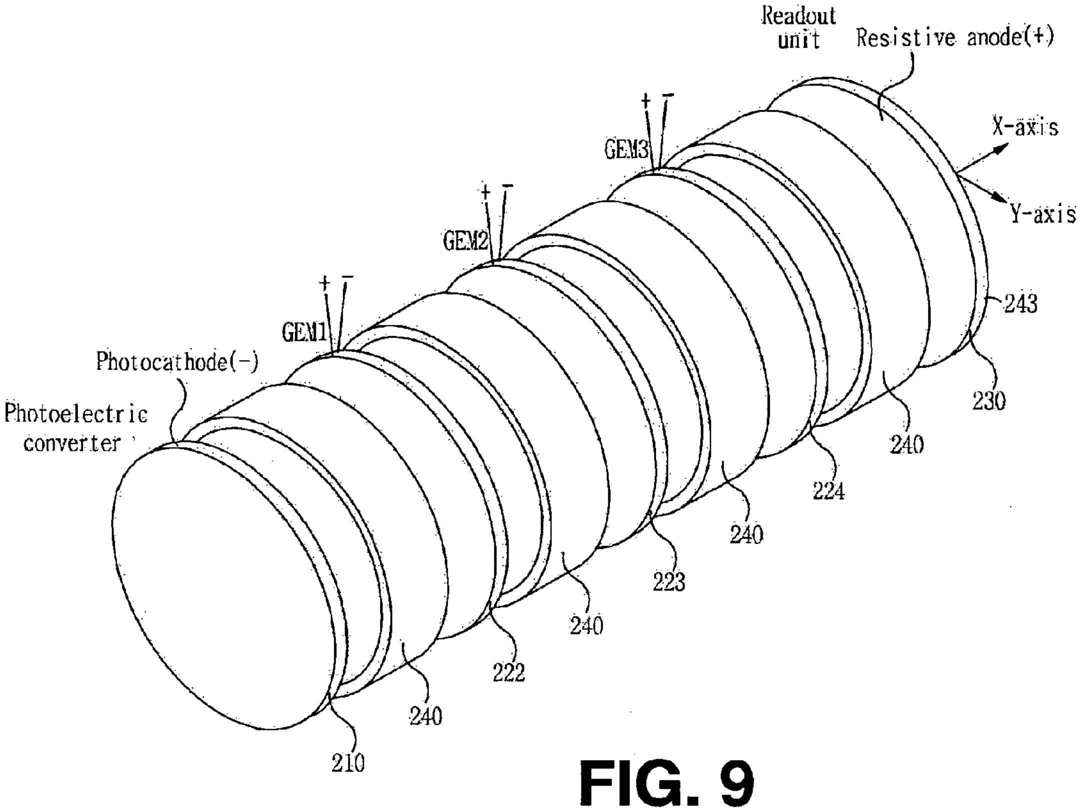
FIG. 9 is an exploded perspective view of FIG. 8.

FIG. 6 is a perspective view illustrating an example of a housing of the gas electron multiplier detector in FIG. 1, and FIG. 7 is an exploded perspective view of FIG. 6. FIGS. 6 and 7 show an example in which coupling portions are in the form of a rectangular case. FIG. 8 is a perspective view illustrating another example of the housing of the gas electron multiplier detector in FIG. 1, and FIG. 9 is an exploded perspective view of FIG. 8. FIGS. 8 and 9 show an example in which coupling portions are in the form of a cylindrical case.

The gas electron multiplier detector 200 further comprises GEM spacers 240 for defining outer walls of spaces between the photoelectric converter 210 and the gas electron multiplier 220 and between the gas electron multiplier 220 and the readout unit 230.

The GEM spacers 240 allow the gas electron multiplier detector 200 to be configured in the form of a rectangular or cylindrical post. The GEM spacers 240 define the outer walls between adjacent ones of the photoelectric converter 210, the gas electron multiplier 220 and the readout unit 230, and form a housing for the photoelectric converter 210, the gas electron multiplier 220 and the readout unit 230 by bonding connection surfaces thereof to each other using an adhesive.

The GEM spacers 240 include the main gas for ionization and the quenching gas filled therein, wherein the gases are sealed, or injected and discharged in either a gas sealing manner or a gas injecting-discharging manner.

The GEM spacers 240 are formed of one or two or more insulating materials selected from the group consisting of Mylar film, epoxy, flexy glass and G-10 to prevent an electric current from flowing between the GEM layers of the gas electron multiplier 220.

Figure 10:
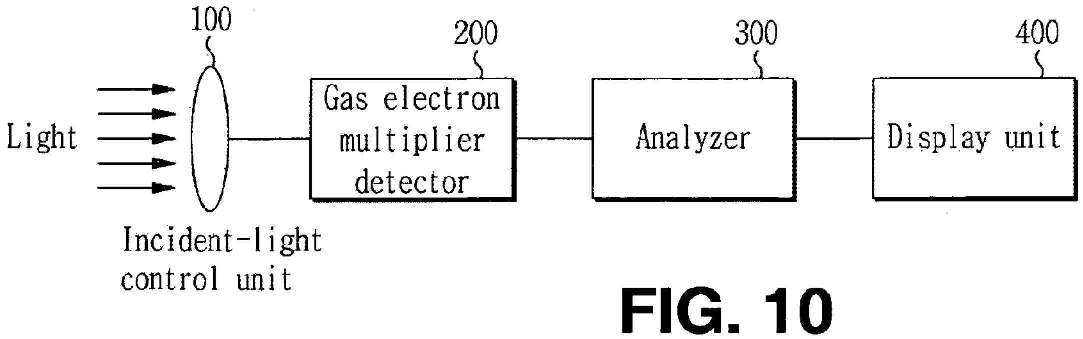
FIG. 10 is a block diagram illustrating the configuration of an example of the photodetector of FIG. 1 to which an incident-light control unit, an analyzer and a display unit are added.

FIG. 10 is a block diagram illustrating the configuration of an example of the photodetector of FIG. 1 to which an incident-light control unit, an analyzer and a display unit are added. As shown in the figure, the digital imaging photodetector with the gas electron multiplier further comprises an incident-light control unit 100 for controlling incident light and delivering the light to the gas electron multiplier detector 200.

The incident-light control unit 100 comprises at least one of a laser, an X-ray generator, a gamma-ray source, a variety of lenses, a variety of mirrors, an interferometer, and a diffractor. The digital imaging photodetector with the gas electron multiplier further comprises an analyzer 300 for analyzing and processing planar coordinates output from the gas electron multiplier detector 200.

Figure 11:
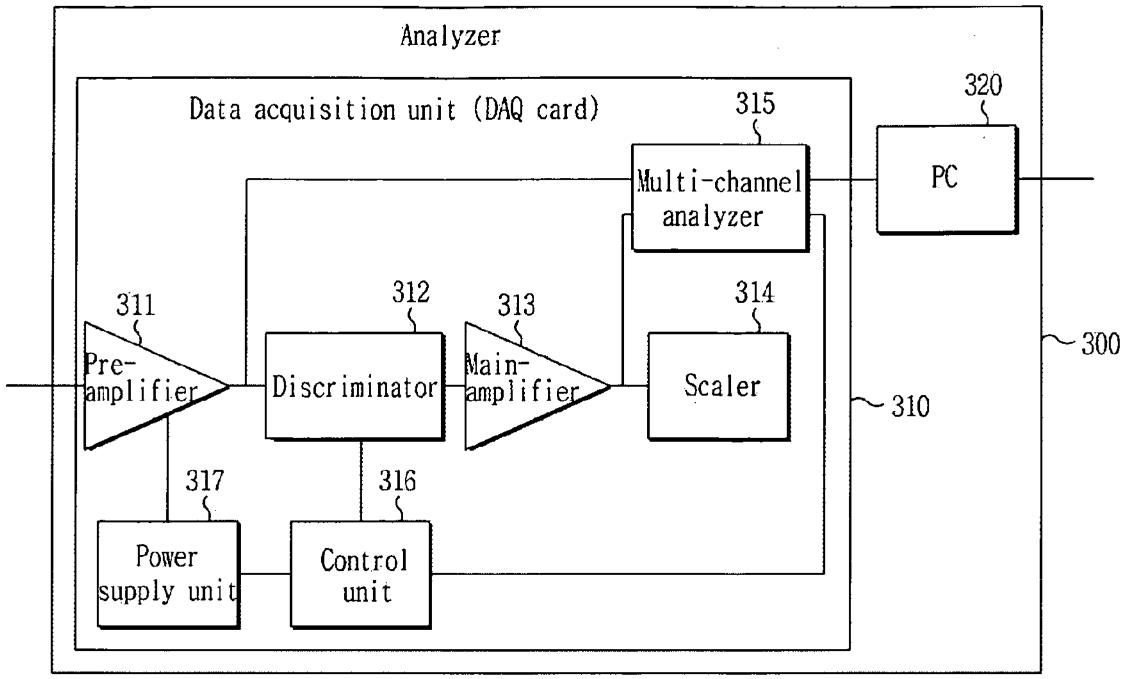
FIG. 11 is a block diagram illustrating the configuration of an example of the analyzer in FIG. 10.

FIG. 11 is a block diagram illustrating the configuration of an example of the analyzer in FIG. 10. As shown in the figure, the analyzer 300 comprises a data acquisition unit (e.g., DAQ card) 310 for receiving an output signal of the gas electron multiplier detector 200 and analyzing planar coordinates according to the intensity of the output signal; and a personal computer (PC) 320 for processing the planar coordinates analyzed by the data acquisition unit 310.

The data acquisition unit 310 comprises a pre-amplifier 311 for amplifying the output signal of the gas electron multiplier detector 200; a discriminator 312 for eliminating noise from the amplified signal provided by the pre-amplifier 311; a main-amplifier 313 for amplifying the discriminated signal from the discriminator 312; a scaler 314 for scaling an output of the main-amplifier 313; a multi-channel analyzer (MCA) 315 for performing amplification analysis of a pulse amplitude spectrum for the output of the pre-amplifier 311, and performing multiscaler analysis of a discrimination curve and a high-temperature (HT) plateau curve for the output of the main-amplifier 313 to classify signals depending on the intensity of the signals and to recognize and output an energy distribution of the incident light; a control unit 316 for receiving an output of the multi-channel analyzer 315 and controlling an operation of the discriminator 312; and a power supply unit 317 for supplying power to the pre-amplifier 311 under the control of the control unit 316.

Figure 12:
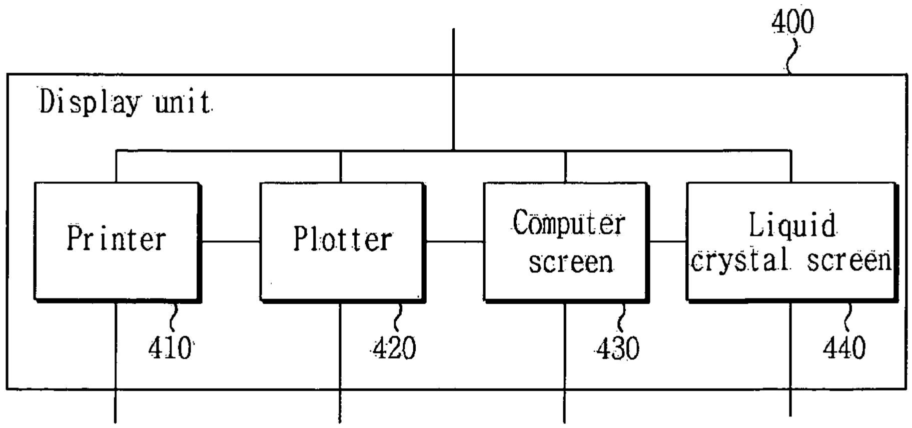
FIG. 12 is a block diagram illustrating the configuration of an example of the display unit in FIG. 10.

FIG. 12 is a block diagram illustrating the configuration of an example of the display unit in FIG. 10. As shown in the figure, the digital imaging photodetector with the gas electron multiplier further comprises a display unit 400 for receiving an output of the analyzer 300 and displaying the output. The display unit 400 comprises at least one of a printer 410, a plotter 420, a computer screen 430 and a liquid crystal screen 440.

The operation of the digital imaging photodetector with the gas electron multiplier according to the present invention constructed as above will be described in detail with reference to the accompanying drawings. The present invention relates to detection of light in a wavelength range from visible rays to X-rays (50 nm to 850 nm). The present invention is directed to real-time imaging of image information by multiplying photoelectrons or Compton electrons, which are discharged due to the photoelectric effect or the Compton effect induced by visible rays, ultraviolet rays or X-rays, using the gas electron multiplier.

FIG. 1 is a block diagram illustrating the configuration of the digital imaging photodetector with a gas electron multiplier according to an embodiment of the present invention, and FIG. 10 is a block diagram illustrating the configuration of an example of the photodetector of FIG. 1 to which the incident-light control unit, the analyzer and the display unit are added.

In the present invention, the gas electron multiplier detector 200 may comprise the photoelectric converter 210, the gas electron multiplier 220, and the readout unit 230. In addition, the digital imaging photodetector may further comprise the incident-light control unit 100, the analyzer 300, the display unit 400.

The incident-light control unit 100 effectively controls incident light. The incident-light control unit 100 refers to a laser, an X-ray generator, a gamma-ray source, a variety of lenses and mirrors, an interferometer, a diffractor, or the like. The incident-light control unit 100 is required for performance tests and applications of the manufactured gas electron multiplier detector 200. Thus, the incident-light control unit 100 is used for performance tests of a sample of the gas electron multiplier detector 200 so as to investigate and test whether it is applicable to a laser-based superprecision position detector.

Figure 13:
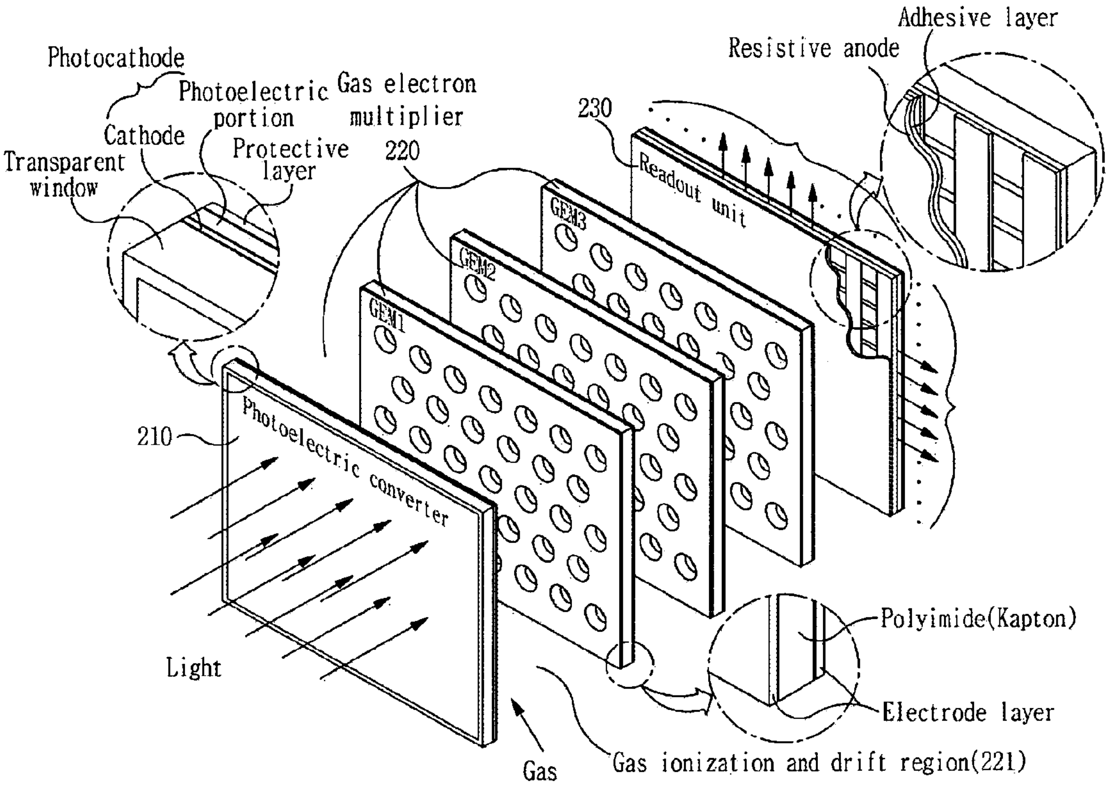
FIG. 13 is a conceptual diagram generally illustrating an example of the configurations of FIGS. 1 to 12.

FIG. 13 is a conceptual diagram generally illustrating an example of the configurations of FIGS. 1 to 12. In the gas electron multiplier detector 200, the photoelectric converter 210 may include the transparent window 211, the photocathode 212, and the protective layer 215. The photocathode 212 may include the cathode 213 and the photoelectric portion 214.

The photoelectric converter 210 is an apparatus for converting light incident on the gas electron multiplier detector 200 into photoelectrons or Compton electrons. The transparent window 211 is formed of a material (generally, quartz) capable of transmitting or blocking light according to a detection purpose. The cathode 213 is formed by coating an electrode material (generally, a material with high conductivity such as copper, aluminum, silver or gold) on an inner surface of the transparent window 211. The photoelectric portion 214 is formed by coating the cathode 213 with a photoelectric material that well reacts with photons having a wavelength in a detection range. The protective layer 215 is formed of a protective-layer material coated on the photoelectric portion 214 for stably maintaining the lifetime of the photoelectric portion 214 even though ions collide therewith while the photoelectric material operates in a gas. The cathode 213 and the photoelectric portion 214 are collectively called the photocathode 212.

The cathode 213 is coated with the electrode material that is at least one selected from the group consisting of copper, aluminum and platinum. A material with superior conductivity is used as the electrode material. The cathode 213 is coated with the electrode material to a thickness of 1 to 50 nm, preferably, 5 nm to 10 nm.

At least one selected from the group consisting of CsTe, Bialkali (Cs—Sb based) or Multialkali (K—Cs—Sb based) is used as the photoelectric material of the photoelectric portion 214. The photoelectric material is coated to a thickness of 1 to 100 nm, preferably, 15 nm to 35 nm.

At least one selected from the group consisting of CsI and CsBr is used as the protective-layer material of the protective layer 215, and is coated to a thickness of 1 nm to 100 nm, preferably, 10 nm to 20 nm. The cathode 213 and the protective layer 215 should have a work function that is set to be larger than a work function of the photoelectric portion 214 and energy of photons to be detected.

Each of the layers is deposited by means of sputtering or pulsed laser deposition. Meanwhile, the gas electron multiplier 220 may comprise three gas electron multiplier (GEM) layers, as shown in FIGS. 3 and 13.

Figure 14:
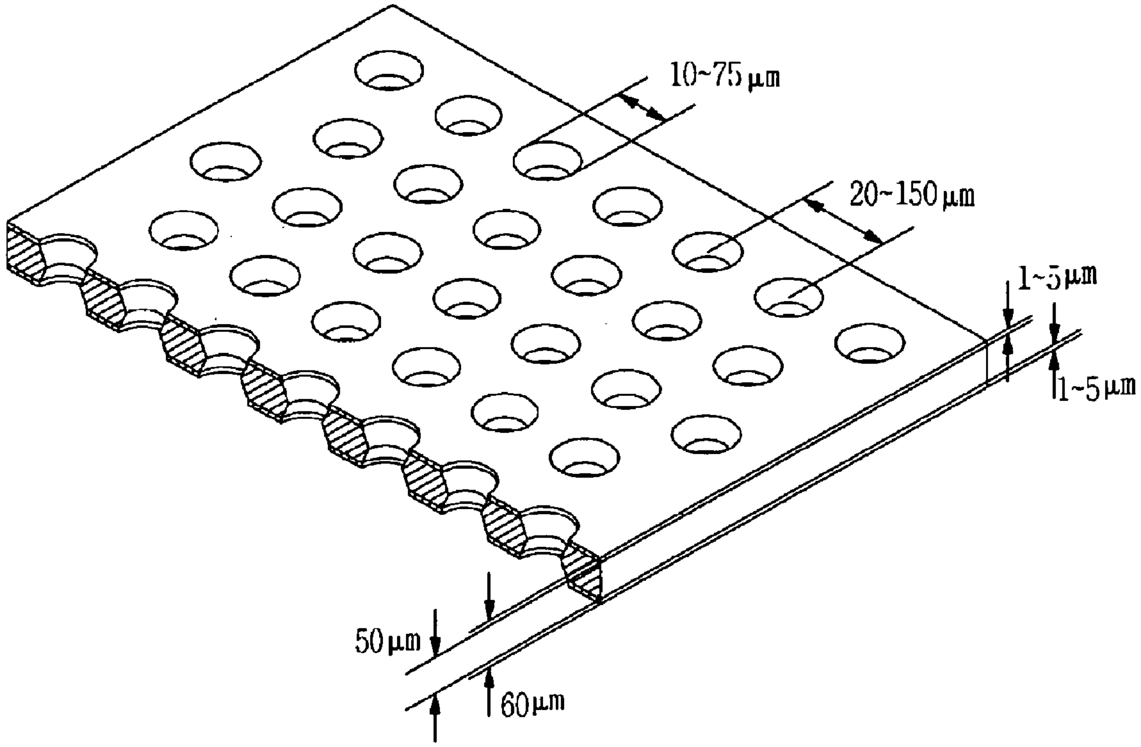
FIG. 14 is a perspective view illustrating an example of a foil of the gas electron multiplier in FIG. 1.
Figure 15:
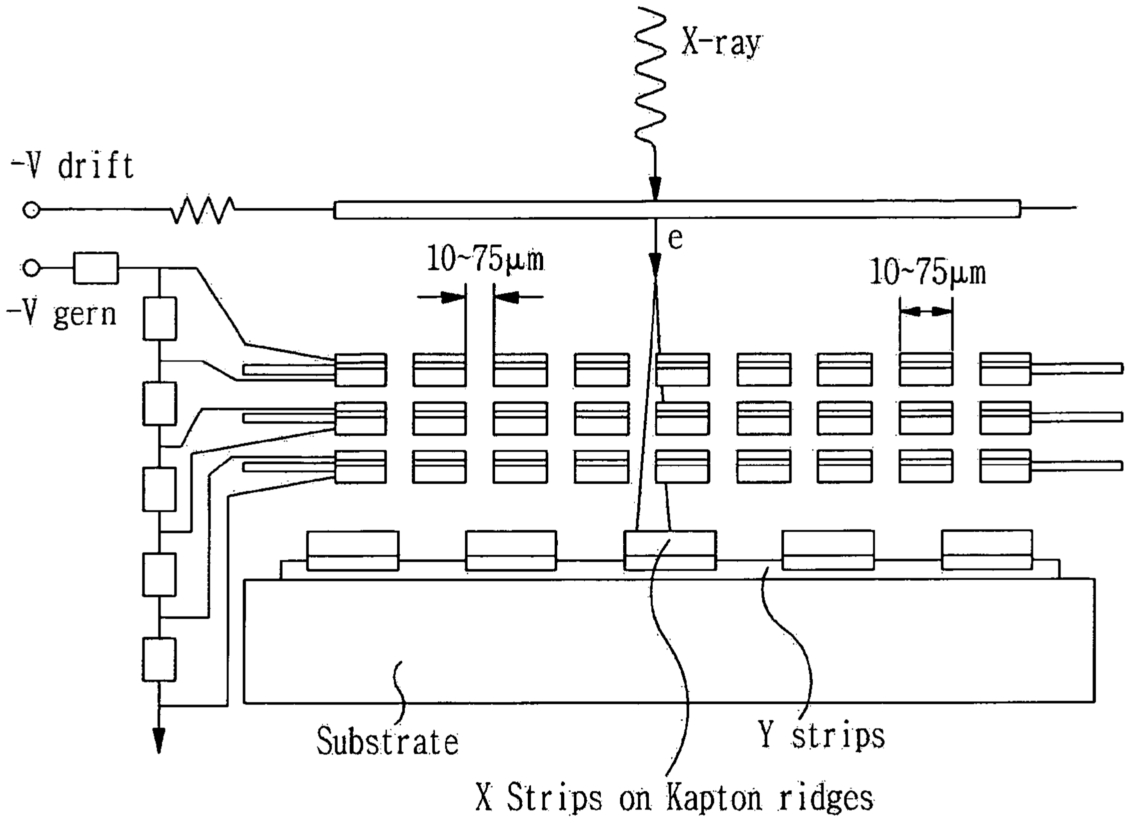
FIG. 15 is a conceptual diagram illustrating an example of ionization by photoelectrons or Compton electrons in the photoelectric converter of the gas electron multiplier detector of FIG. 13, and gas electron multiplication in the gas electron multiplier.

FIG. 14 is a perspective view illustrating an example of a foil of the gas electron multiplier in FIG. 1. GEM technology uses a very simple concept of electromagnetics. As shown in FIG. 15, when charged particles or photons are incident into a GEM detector, a gas filled therein is ionized. Resulting positive ions slowly move to the cathode by a potential difference applied to both ends of the GEM detector, and electrons move to an anode located on the bottom of the GEM detector at high speed (the electrons move at a speed that is about 1000 times or more as large as that of the positive ions due to the applied voltage since the electrons have a mass that is at least 1/2000 times as light as that of the positive ions).

Figure 17:
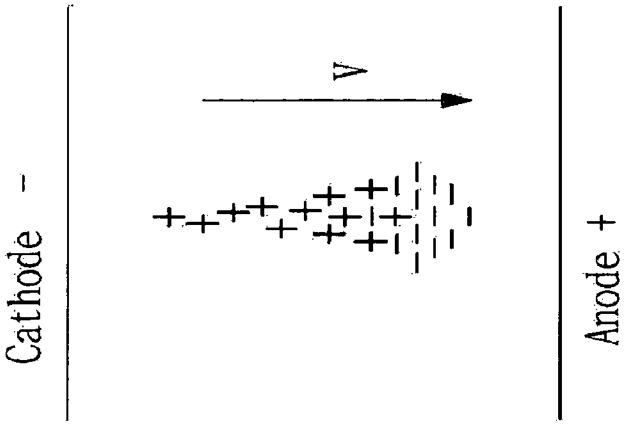
FIG. 17 is a conceptual diagram illustrating an electron avalanche in the gas electron multiplication in FIG. 15.
Figure 16:
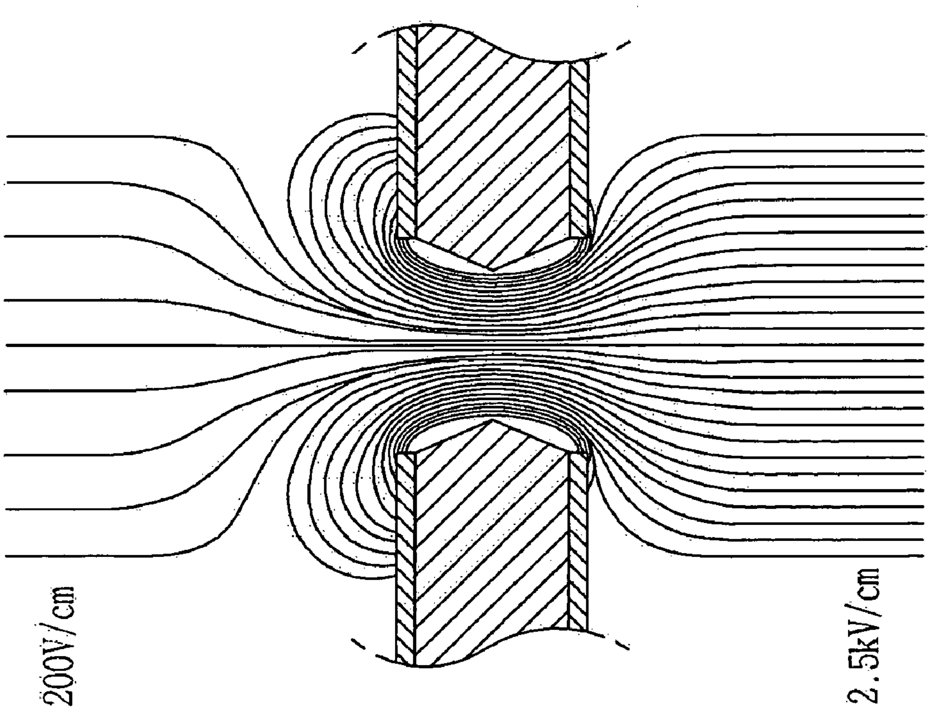
FIG. 16 is a conceptual diagram illustrating an example in which an electrical field is densified in a hole of the gas electron multiplier in FIG. 15.

FIG. 15 is a conceptual diagram illustrating an example of ionization by photoelectrons or Compton electrons in the photoelectric converter of the gas electron multiplier detector of FIG. 13, and gas electron multiplication in the gas electron multiplier, FIG. 16 is a conceptual diagram illustrating an example in which an electrical field is densified in the hole of the gas electron multiplier in FIG. 15, and FIG. 17 is a conceptual diagram illustrating an electron avalanche in the gas electron multiplication in FIG. 15.

The electrons moved to the anode are quickly accelerated into the holes of the GEM foil by means of an electrical field (>$10^4$ V/cm) that is densified due to a special geometric structure of the GEM foil. Electrons created through an electron avalanche in which the accelerated electrons collide with the gas in the holes and are then multiplied by several thousand times (see FIGS. 14 to 17) or light simultaneously emitted by means of the electron avalanche is detected so that position and time information on the charged particles or photons, which are incident on above the GEM foils (the gas ionization and drift region or drift-conversion region 221) within the GEM detector or on the photoelectric converter 210, can be measured with high resolution.

Figure 18:
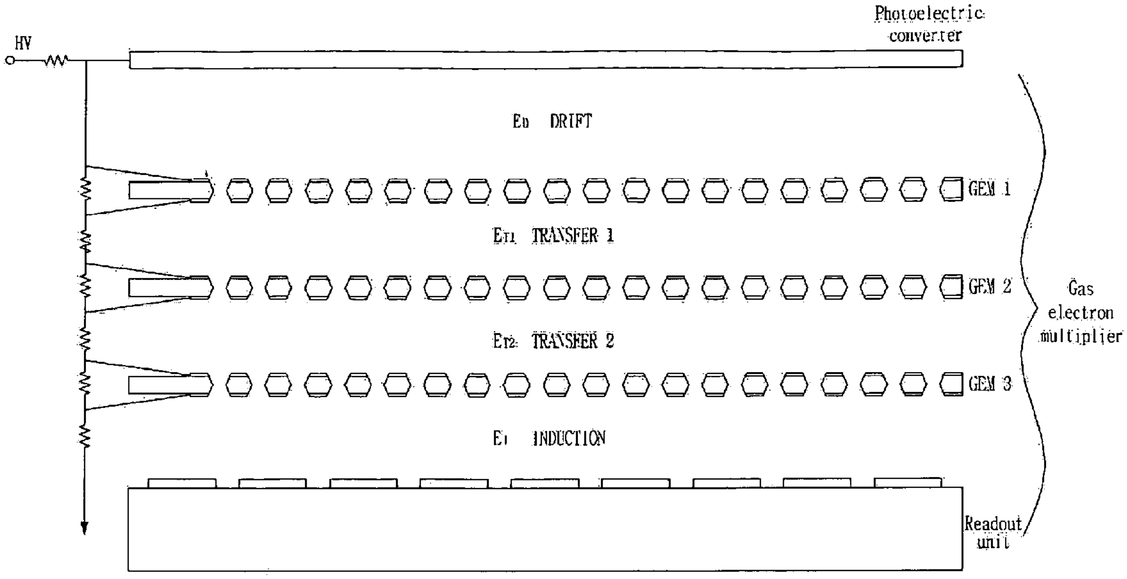
FIG. 18 is a conceptual diagram illustrating an example in which voltages are distributed to respective parts of the gas electron multiplier in FIG. 1.
Figure 19:
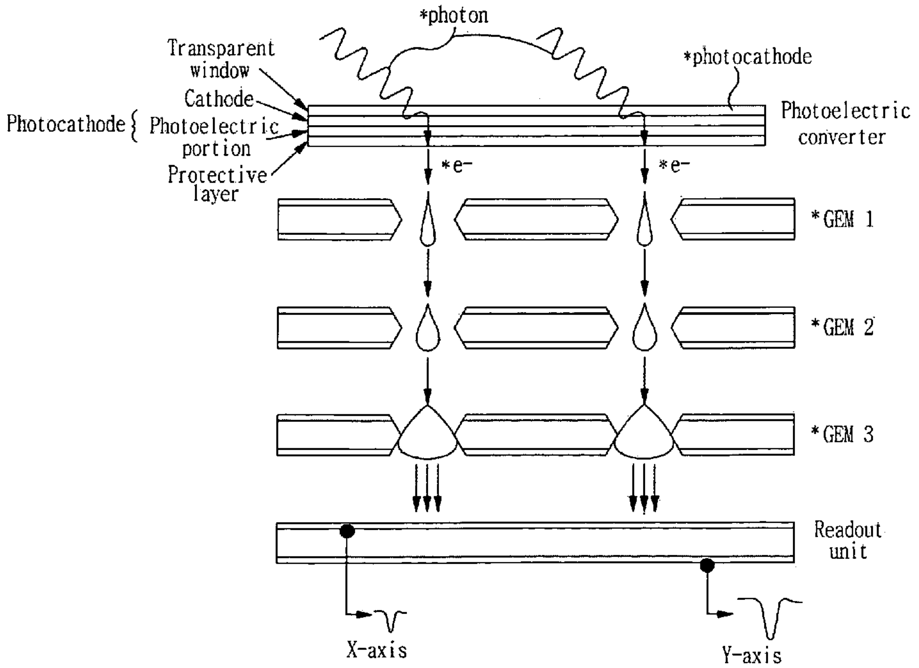
FIG. 19 is a conceptual diagram illustrating a process of implementing an electron cloud arriving at the readout unit into one point in a two dimensional space by distributing the electron cloud into output signals of X-axis strips and output signals of Y-axis strips in FIG. 13.
Figure 20:
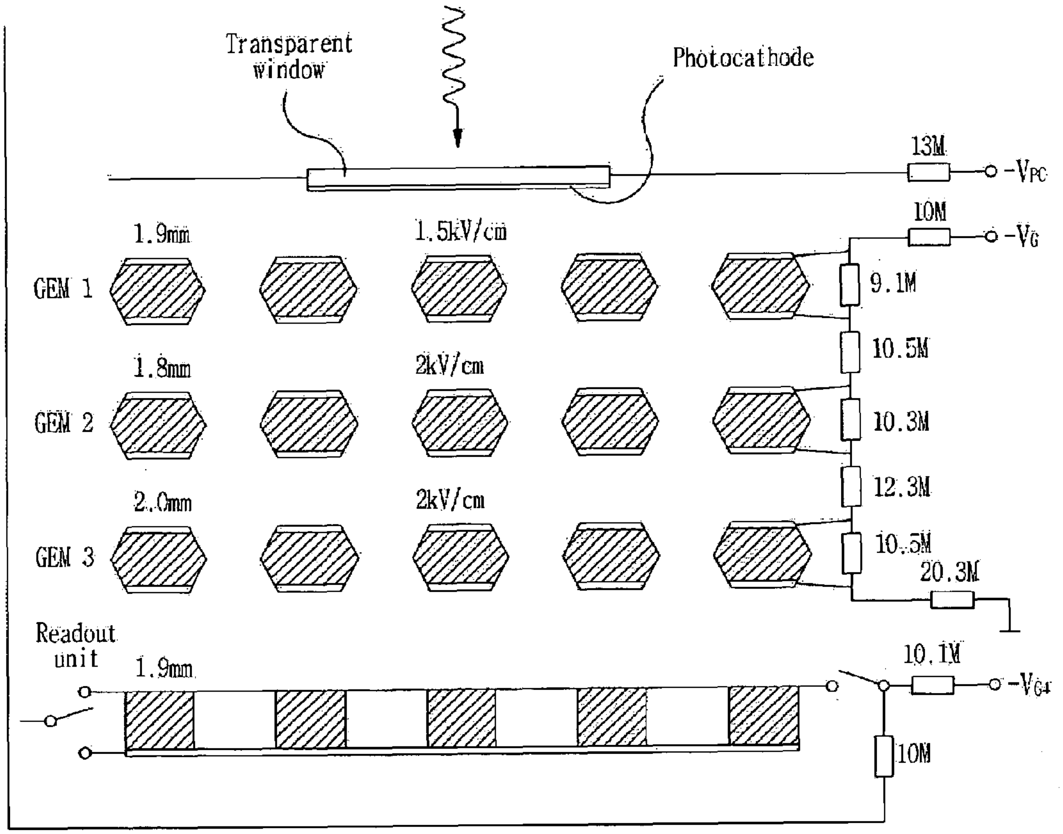
FIG. 20 is a conceptual diagram illustrating an example of gas electron multiplication by three-stage GEMs and voltage distribution to the respective GEMs in FIG. 1.
Figure 21:
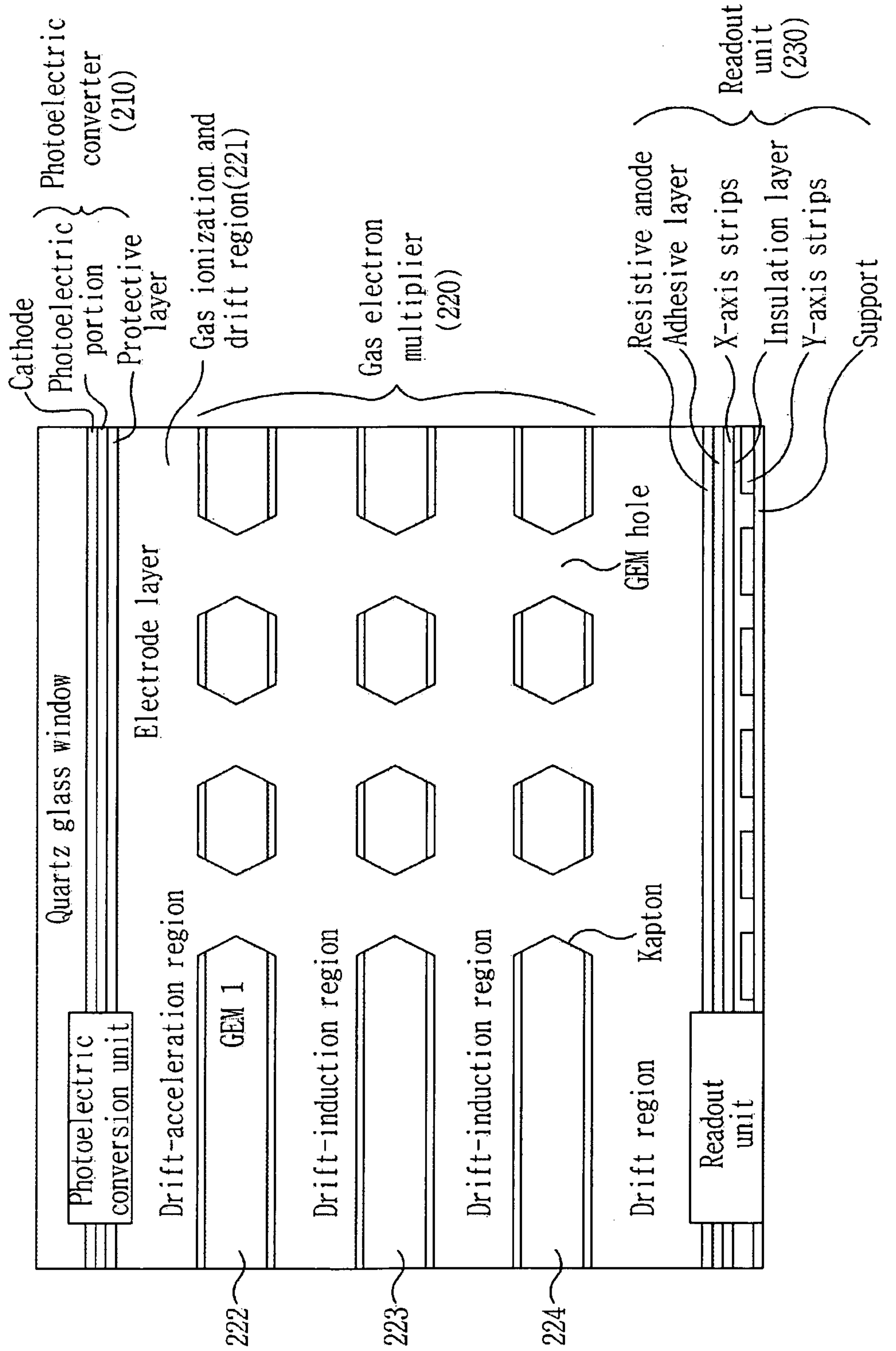
FIG. 21 is a conceptual diagram illustrating the operations of the components shown in FIGS. 1 to 4.

FIG. 18 is a conceptual diagram illustrating an example in which voltages are distributed to respective parts of the gas electron multiplier in FIG. 1, FIG. 19 is a conceptual diagram illustrating a process of implementing an electron cloud arriving at the readout unit into one point in a two dimensional space by distributing the electron cloud into output signals of X-axis strips and output signals of Y-axis strips in FIG. 13, FIG. 20 is a conceptual diagram illustrating an example of gas electron multiplication by three-stage GEMs and voltage distribution to the respective GEMs in FIG. 1, and FIG. 21 is a conceptual diagram illustrating the operations of the components shown in FIGS. 1 to 4.

In the present invention, as shown in FIG. 20, three layers of the conductive material, photoelectric material (CsI, CsTe, Bialkali, Multialkali or the like) and photocathode protective layer are deposited respectively to vc thicknesses of 5 nm, 15 nm to 35 nm, and 10 nm on a lower end of the transparent window 211 (formed of quartz or the like) of the photoelectric converter 210 (see FIG. 19), so that photoelectrons or Compton electrons resulting from visible rays, ultraviolet rays or X-rays are guided to be incident on the gas ionization and drift region 221 that is above the GEM foils (see FIG. 19).

The emitted photoelectrons or Compton electrons are stepwise multiplied using the three-stage GEM foils (see FIG. 19), so that two-dimensional position (x, y) information of the photons incident on the GEM detector can be imaged as (x, y, t) information in real time (t). Thus, digital imaging can be realized in real time by obtaining (x, y, t) information of the visible ray using the GEM.

FIG. 18 illustrates the concept of the three-stage GEM detector, and FIG. 19 illustrates an example of a multi-stage GEM photo-multiplying imaging apparatus comprising continuously arranged three-stage GEM foils each of which has a semi-transmissive photocathode. The photoelectrons or Compton electrons emitted from the solid-state photocathode are introduced into the holes of one of the GEM foils and multiplied by means of an electron avalanche, and are then sequentially multiplied by the subsequent GEM foils, resulting in a great effective gain. In a simple GEM photo-multiplier, an electrical signal induced by the last electron avalanche can be read on one channel by an upper or lower electrode of the last GEM. In the present invention, a micro printed circuit board (MPCB) is used to obtain two-dimensional position information (x, y) of an electrical pulse signal of the multiplied electrons.

Meanwhile, because photoelectrons obtained from visible rays, ultraviolet rays, or low-energy X-rays merely exhibit several eV to several tens eV, the photoelectrons cannot ionize the gas in the GEM detector. However, when a voltage of about 500V to 2000V is applied between the photocathode and the GEM foils, the photoelectrons or Compton electrons are accelerated and 0 to 5 electrons can be separated from the gas in the gas ionization and drift region (drift-conversion region) 221 with a gap of 1 mm. Since the monovalent (lowest) ionization energy of the gas is about 10 to 20 eV and average energy required for generating electron-ion pairs of the gas is about 30 eV, the number of the separated electrons can be calculated using the formula of the Townsend' first coefficient ($\alpha$). $\alpha$ is defined as the number of times one electron generates electron-ion pairs excluding the electron itself through ionization while the electron moves by a distance of 1 cm due to an electrical field. An electron avalanche induced by the pairs through the GEM holes can provide an effective gain of about $10^5$. The readout unit 230 outputs the electron cloud (or electron bundle) as an electrical signal. Thus, the electron cloud or electron bundle can be digitalized and displayed as a real-time digital image on a computer monitor or display device.

Meanwhile, the configuration and operation of the gas electron multiplier (GEM) 220 will be described in detail with reference to FIGS. 3 and 13. The first gas electron multiplier layer (GEM1) 222 receives the photoelectrons or Compton electrons converted by the photoelectric converter 210, is configured with a selected gas suitable for the coated photocathode 212 in the photoelectric converter 210 and the wavelength of light to be detected, accelerates the received photoelectrons or Compton electrons with low energy, and ionizes the gas by means of an electron avalanche induced using the accelerated photoelectrons or Compton electrons so as to multiply the number of the electrons.

The first gas electron multiplier layer 222 may be configured such that a distance between the first gas electron multiplier layer 222 and the photoelectric converter 210 ranges from 0.1 mm to 10 mm, preferably, 0.1 mm to 3 mm. Further, a voltage of 100V to 10000V is applied to the first gas electron multiplier layer 222. Preferably, a voltage of 500V to 2000V is applied to the first gas electron multiplier layer 222.

It is possible to select the gas suitable for the wavelength of light to be detected and the coated photocathode 212. When a voltage of 500 to 2000V is applied to a region between the photoelectric converter 210 and the foil of the gas electron multiplier 220 of the gas electron multiplier detector 200 (the drift-conversion region with a gap of 0.1 mm to 2 mm), the first gas electron multiplier layer (GEM1) 222 functions to accelerate the low-energy photoelectrons or Compton electrons and ionizes the gas using the accelerated photoelectrons or Compton electrons, thereby separating 0 to 5 electrons from the gas.

At this time, the ionized main gas (e.g., inert gas) collides with a small amount of quenching gas (organic polyatomic gas) before colliding with the photocathode 212 so that energy generated upon return of the ionized main gas to a neutral gas can be imparted to the quenching gas so as to ionize the quenching gas. The ionized gas is coupled with free electrons by colliding with the photocathode 212. As a result, the gas is returned to an original state while ultraviolet-ray emission is suppressed (subsequent ultraviolet-ray emission can be controlled by emitting energy in the form of vibration energy or decomposed energy components upon transition from an exited state to a ground state).

In addition, as for the ionized and quenching gases used in the gas ionization and drift region, a proper gas that can be decomposed into individual molecules even by means of continuous ionization due to ultraviolet rays generated in the gas electron multiplier detector 200 during the ionization or collision with the photocathode 212, thereby preventing the occurrence of discharge (Penning effect) is mixed at a certain ratio with a gas capable of increasing a gain and having long lifetime, and at the same time, a gas having a rapid response time to improve a temporal resolution is filled into the gas ionization and drift region 221 of the gas electron multiplier detector 200 at proper pressure.

Attention should be paid such that the gas electron multiplier detector 200 operates in the proportion region in view of its characteristics. Discharge may occur if the applied voltage exceeds the G-M region.

Further, the second gas electron multiplier (GEM2) 223 accelerates the electrons ionized by the first gas electron multiplier layer 222 and multiplies the number of the electrons with a certain multiplication through an electron avalanche.

A voltage of 100V to 10000V is applied to the second gas electron multiplier layer 223. Preferably, a voltage of 500V to 2000V is applied to the second gas electron multiplier layer 223.

When a voltage of 500V to 2000V is applied between the photocathode 212 and the second gas electron multiplier layer 223 of the photoelectric converter 210, the electrons ionized by the photoelectrons or Compton electrons in the gas ionization and drift region 221 are accelerated into the holes of the GEM foils. In this case, the number of the electrons is multiplied $10^3$ to $10^4$ times through the electron avalanche. The GEM layer behaviors as a kind of condenser due to Kapton (polyimide) interposed between both copper layers.

The third gas electron multiplier (GEM3) 224 additionally multiplies the electrons multiplied by the second gas electron multiplier layer 223 and delivers them to the readout unit 230. In this case, the third gas electron multiplier layer 224 is configured such that a distance between the third gas electron multiplier layer 224 and the second gas electron multiplier layer 223 ranges from 0.1 mm to 10 mm, preferably, from 0.1 mm to 2 mm.

Further, the third gas electron multiplier layer 224 is configured such that a distance between the third gas electron multiplier layer 224 and the readout unit 230 ranges from 0.1 mm to 10 mm, preferably, from 0.1 mm to 2 mm.

A voltage of 100V to 10000V is applied to the third gas electron multiplier layer 224. Preferably, a voltage of 500V to 2000V is applied to the third gas electron multiplier layer 224.

The third gas electron multiplier layer 224 functions to additionally multiply the electrons, which have been multiplied by the second gas electron multiplier layer 223, to $10^5$ to $10^6$ by passing the electrons through the continuously arranged GEM foils. In this case, since the degree of multiplication depends on the distance between the respective layers, a condition under which optimal quantum efficiency is obtained in a wide wavelength range should be found while the distance between the GEM layers is changed by 0.1 mm to 2 mm. Furthermore, the distance between the third gas electron multiplier layer 224, which is the last GEM layer, and the readout unit 230 is changed by 0.1 mm to 2 mm, and at the same time, effects on a spatial resolution and a change in the quantum efficiency are checked to obtain optimal conditions according to the distance between layers so that the detector can be designed based on the conditions.

Meanwhile, the readout unit 230 will be described with reference to FIGS. 1, 4 to 9 and 13. First, the readout unit 230 receives the multiplied electron cloud as an electrical signal from the gas electron multiplier 220, understands the electrical signal as planar coordinates, and outputs the planar coordinates.

The readout unit 230 may comprise a micro printed circuit board (MPCB), which may include the resistive anode 231, the adhesive layer 232, the X-axis strips 233, the insulation layer 234 and the Y-axis strips 235. The readout unit 230 further comprises the support 236 for supporting the readout unit 230. The support 236 may be formed of glass or plastic material such as G-10, epoxy and flexy glass.

The resistive anode 231 accepts the multiplied electron cloud as an electrical signal from the gas electron multiplier 220. The resistive anode 231 may be formed of a material having high surface resistance, such as Mylar film.

The adhesive layer 232 bonds the resistive anode 231 and the X-axis strips 233 to each other. The adhesive layer 232 may be formed to have a thickness of 10 μm to 100 μm, preferably, about 50 μm.

The X-axis strips 233 distribute and output the electrical signal input via the resistive anode 231 along one axis. The X-axis strips 233 may be formed to have a width of 10 μm to 200 μm, preferably, about 80 μm (see FIG. 5).

The insulation layer 234 insulates the X-axis strips 233 and the Y-axis strips 235 from each other. The insulation layer 234 may be formed of Mylar film or polyimide (Kapton), which is a surface-resistive material, or a similar material. The insulation layer 234 may be formed to have a thickness of 10 μm to 100 μm, preferably, about 50 μm.

Further, the Y-axis strips 235 distribute and output the electrical signal input via the resistive anode 231 along another axis. The Y-axis strips 235 may be formed to have a width of 10 μm to 1000 μm, preferably, about 350 μm (see FIG. 5).

The readout unit 230 distributes the electron cloud multiplied by the third gas electron multiplier layer 224, which is the last GEM layer, to the micro circuit of the MPCB along x- and y-axes so that the electron cloud can be received as an electrical signal, thereby finding planar coordinates.

To lower a spatial resolution from about 20 μm to 10 μm or less, the adhesive layer 232 with a thickness of about 50 μm is formed on the MPCB having readout strips or pads printed thereon as shown in FIG. 5, and a material (usually, Mylar film) having a surface resistance of 2.5 MΩ? or more is formed to a thickness of about 50 μm on the adhesive layer 232. The subsequent formation of the resistive anode 231 results in an RC network with a resistance-capacitance (RC) time constant. Consequently, charges are induced on the MPCB due to a spread time difference of distribution of charges arriving at the surface, thereby effectively increasing the spatial resolution.

The readout unit 230 may be configured using ASIC readout electronics or a delay-line readout MPCB. Alternatively, as for a very different readout device, the readout unit 230 may be configured by coupling a CCD camera with a screen (P20, P22, P46 or the like) doped with phosphor or fluorescent material instead of a PCB. Here, ultraviolet rays or visible rays emitted upon occurrence of the electron avalanche in the holes of the GEM layers may be detected to obtain an image from incident light. In this case, the wavelength of output light depends on the internal gas.

The readout unit 230 may be constructed of one selected from the group consisting of applicable specific integrated circuit (ASIC) readout electronics, resistive anode readout electronics, pad or strip anode electronics, delay-line anode readout electronics, microstrip gas chamber (MSGC) readout electronics, and scintillation readout electronics, according to a detection purpose. The detected analog signal may be converted into a digital signal by means of analog-to-digital conversion (ADC).

In a case where the readout unit 230 is configured using a scintillation material, a fluorescent material or a phosphor material, however, it is difficult to obtain two-dimensional digital information from incident light. The scintillation material may be reduced in size and then arranged in an array form in order to acquire two-dimensional information. The scintillation material should be processed into fine pixels in order to obtain a micro-scale resolution.

Alternatively, the readout unit 230 may be configured using a microchannel capillary plate. However, since the microchannel capillary plate cannot be made larger and is fragile, the drawbacks should be overcome to configure the readout unit.

In a case where the readout unit 230 is configured using two PMT-based methods, light-light-electrons-electrical signal (electron multiplication) processes are divided. On the other hand, if the readout unit 230 is configured using an MPCB, all processes are combined within a small thickness (5 to 20 mm), so that planar information can be extracted with a considerably high resolution from incident light. In this case, when energy is measured, a Landau distribution is obtained since the gap between the photoelectric converter 210 and the first gas electron multiplier layer GEM1 221 is too small. This requires minute examination of a mechanism according to the Bethe-Bloch formula.

An example of housing the gas electron multiplier detector 200 to form the GEM spacers 240 will be described with reference to FIGS. 6 to 9. The GEM spacers 240 may be constructed in the form of a rectangular case as shown in FIGS. 6 and 7, or in the form of a cylindrical case as shown in FIGS. 8 and 9. Of course, the he GEM spacers 240 may be constructed in other forms. The GEM spacers 240 may define outer walls between adjacent ones of the photoelectric converter 210, the gas electron multiplier 220 and the gas electron multiplier 220 and the readout unit 230, and may also house the photoelectric converter 210, the gas electron multiplier 220 and the readout unit 230 by bonding connection surfaces thereof to each other using an adhesive. The GEM spacers 240 include the main gas for ionization and the quenching gas filled therein, wherein the gases are sealed, or injected and discharged in either a gas sealing manner or a gas injecting-discharging manner.

The detector of the present invention may further comprise the analyzer 300 as shown in FIGS. 10 and 11. The analyzer 300 includes the data acquisition unit 310 and the PC 320, and the data acquisition unit 310 may comprise the pre-amplifier 311, the discriminator 312, the main-amplifier 313, the scaler 314, the multi-channel analyzer 315, the control unit 316, and the power supply unit 317. The data acquisition unit 310 may be constructed of a single card such as a data acquisition (DAQ) card.

When a voltage is applied to the gas electron multiplier 220 of the gas electron multiplier detector 200, electrons arrives at the readout unit 230 as the anode, and the readout unit 230 outputs an electrical signal in the form of a voltage. In this case, since the electrical signal is weak, the pre-amplifier 311 amplifies the weak signal, the discriminator 312 eliminates noise, and the main-amplifier 313 amplifies the signal and sends it to the multi-channel analyzer 315 that is a signal processing stage. In this case, since the signal is an analog signal, it is converted into a digital signal by an analog-digital converter (ADC) to facilitate data acquisition and information storage and processing.

The multi-channel analyzer 315 classifies the signal depending on intensity, thereby obtaining an energy distribution of incident light. To obtain two-dimensional information from the incident light, the circuits on the MPCB may be configured in a lattice form along x- and y-axes, and the intensities of signals from the circuits on the MPCB according to the electron cloud multiplied by the last GEM layer may be read along the x- and y-axes.

For example, if signals are intended to be read at an interval of 200 μm from a 2.5 cm×2.5 cm MPCB, information on 15,525(=125×125) (x, y) coordinate points may be acquired, and the number of necessary signal lines is 250(=125+125).

The electrical signal received from the readout unit 230 is sent to the data acquisition unit 310, which is a DAQ card, and accumulated as information on two-dimensional points and then made into data. The data can be subjected to image-processing in real time on the PC 320.

The photodetector may further comprise the display unit 400 (see FIGS. 10 and 12) for displaying the data accumulated in the data acquisition unit 310 that is the DAQ card. The display unit 400 performs a colorization process for the acquired, stored and accumulated data using a computer program and displays the data according to a density distribution. The printer 410, the plotter 420, the computer screen 230, the liquid crystal screen 240, or the like may be used as the display unit 400.

The gas electron multiplier detector 200 may be configured as a unitary component and then connected to the analyzer 300 and the display unit 400. This allows only the gas electron multiplier detector 200 to be replaced when the lifetime of the gas electron multiplier detector 200 is expired.

According to the present invention, real-time digital imaging of image information can be achieved by multiplying photoelectrons or Compton electrons, which are discharged due to the photoelectric effect or the Compton effect induced by visible rays, ultraviolet rays or X-rays, using the gas electron multiplier.

While the present invention has been described with reference to the preferred embodiments, various changes and modifications and equivalents thereof can also be made thereto. It will be apparent that the present invention can be equally applied by properly modifying the embodiments. Therefore, the above description does not limit the scope of the present invention defined by the appended claims.

The invention claimed is:

1. A digital imaging photodetector with a gas electron multiplier, comprising:

a gas electron multiplier detector, said gas electron multiplier detector including:

a photoelectric converter for converting incident light into photoelectrons or Compton electrons, comprising a transparent window, a photocathode and a protective layer of said photocathode;

a gas electron multiplier (GEM) for receiving the photoelectrons or Compton electrons from the photoelectric converter and multiplying them; and a readout unit for receiving an electrical signal indicating a position where an electron cloud multiplied in the gas electron multiplier arrives on an anode, recognizing coordinates of the electron cloud based on the received signal, and outputting the coordinates of the electron cloud.

2. The digital imaging photodetector as claimed in claim 1, wherein the transparent window transmits or blocks the incident light according to a detection purpose, the incident light transmitted through the transparent window arrives at the photocathode and the protective layer is formed of a protective-layer material coated on the photocathode for stably maintaining the lifetime of the photocathode even though ions collide therewith while a photoelectric material operates in a gas.

3. The digital imaging photodetector as claimed in claim 2, wherein the transparent window is made of a material, such as quartz, capable of transmitting light therethrough and preventing leakage of the internal gas, and has a thickness enough to withstand a pressure difference between the interior and the exterior thereof or external pressure without crushing.

4. The digital imaging photodetector as claimed in claim 2, wherein the photocathode comprises: a cathode at which the incident light transmitted through the transparent window arrives and which has an electrode material coated thereon; and a photoelectric portion formed by coating a primary photoelectric material, which well reacts with photons having wavelengths in a detection range, on the cathode.

5. The digital imaging photodetector as claimed in claim 4, wherein the cathode is coated with the electrode material that is at least one selected from the group consisting of copper, aluminum, gold and platinum.

6. The digital imaging photodetector as claimed in claim 4, wherein The cathode is coated with the electrode material to a thickness of 1 to 50 nm.

7. The digital imaging photodetector as claimed in claim 4, wherein the photoelectric portion is formed of a coating of the photoelectric material that is at least one selected from the group consisting of CsTe, Bialkali (Cs—Sb based) and Multialkali (K—Cs—Sb based).

8. The digital imaging photodetector as claimed in claim 7, wherein the photoelectric portion is formed by coating the photoelectric material to a thickness of 1 to 100 nm.

9. The digital imaging photodetector as claimed in claim 2, wherein the protective layer is formed of a coating of the protective-layer material that is at least one selected from the group consisting of Csl and CsBr.

10. The digital imaging photodetector as claimed in claim 9, wherein the protective layer is formed by coating the protective-layer material to a thickness of 1 to 100 nm.

11. The digital imaging photodetector as claimed in claim 4, wherein the cathode of the photocathode and the protective layer have a work function that is set to be greater than a work function of the photoelectric portion of the photocathode and than energy of photons to be detected.

12. The digital imaging photodetector as claimed in claim 1, wherein one or more of the transparent window, the photocathode, and the protective layer of the photoelectric converter are deposited by means of at least one of sputtering and pulsed laser deposition.

13. The digital imaging photodetector as claimed in claim 1, wherein the gas electron multiplier includes three GEM layers.

14. The digital imaging photodetector as claimed in claim 1, wherein the gas electron multiplier includes:

a gas ionization and drift region that receives and multiplies the photoelectrons or Compton electrons convened by the photoelectric converter, is configured with a selected gas suitable for a wavelength of light to be detected and the photocathode of the photoelectric converter, accelerates the received photoelectrons or Compton electrons with low energy, and ionizes the gas using the accelerated photoelectrons or Compton electrons;

a first GEM layer for accelerating electrons ionized by the gas ionization and drift region and multiplying the number of the electrons with a certain multiplication by means of an electron avalanche;

a second GEM layer for accelerating the electrons primarily multiplied by the first GEM layer and additionally multiplying the number of the electrons with a certain multiplication by means of an electron avalanche; and a third GEM layer for additionally multiplying the electrons multiplied by the second GEM layer and delivering them to the readout unit.

15. The digital imaging photodetector as claimed in claim 14, wherein the gas ionization and drift region accepts the photoelectrons or Compton electrons generated from the photoelectric converter, ionizes the gas filled therein (a main inert gas and a polyatomic quenching gas) using the accepted photoelectrons or Compton electrons, quickly moves the ionized electrons to the first GEM layer, and slowly moves cations to the photocathode.

16. The digital imaging photodetector as claimed in claim 14, wherein the gas ionization and drift region is configured such that the ionized main gas (inert gas) collides with a small amount of quenching gas (organic polyatomic gas) before colliding with the photocathode so that energy generated upon return of the ionized main gas to a neutral gas can be imparted to the quenching gas so as to ionize the quenching gas, and such that the ionized gas is coupled with free electrons by colliding with the photocathode, whereby the gas is returned to an original state while ultraviolet-ray emission is suppressed.

17. The digital imaging photodetector as claimed in claim 14, wherein a proper gas that can be decomposed into individual molecules even by means of continuous ionization due to ultraviolet rays generated in the gas electron multiplier detector during the ionization or collision with the photocathode, thereby preventing the occurrence of discharge is mixed with a gas capable of increasing a gain and having long lifetime so that the mixture fills the interior of the gas ionization and drift region, or with a gas having a rapid response time to improve a temporal resolution so that the mixture fills the interior of the gas ionization and drift region at proper pressure, the gasses being used as the ionized and quenching gases.

18. The digital imaging photodetector as claimed in claim 14, wherein a voltage applied to the gases used as the ionized and quenching gases allows the gas ionization and drift region to operate in a proportion region.

19. The digital imaging photodetector as claimed in claim 1, wherein the gas electron multiplier includes three sheets of gas electron multiplier foils having holes with a size of 10 to 75 μm and a center-to-center distance of 20 to 150 μm, and the holes have a matrix arrangement in which three neighboring holes are disposed in the form of a regular triangle.

20. The digital imaging photodetector as claimed in claim 1, wherein the gas electron multiplier comprises:

a first gas electron multiplier layer that receives the photoelectrons or Compton electrons converted by the photoelectric converter, is configured with a selected gas suitable for the photocathode coated with the protective layer in the photoelectric converter, rapidly accelerates electrons ionized by the received photoelectrons or Compton electrons with low energy, and ionizes the gas using the accelerated photoelectrons or Compton electrons by means of an electron avalanche in the holes of the gas electron multiplier so as to multiply the number of the electrons;

a second gas electron multiplier layer for accelerating the electrons multiplied by the first gas electron multiplier layer and multiplying the number of the electrons with a certain multiplication by means of an electron avalanche; and a third gas electron multiplier layer for additionally multiplying the electrons multiplied by the second gas electron multiplier layer and delivering them to the readout unit.

21. The digital imaging photodetector as claimed in claim 20, wherein the first gas electron multiplier layer is configured such that a distance between the first gas electron multiplier layer and the photoelectric converter ranges from 0.1 mm to 10 mm.

22. The digital imaging photodetector as claimed in claim 20, wherein a potential difference between the first gas electron multiplier layer and the photoelectric converter allows the first gas electron multiplier layer to operate in a proportion region.

23. The digital imaging photodetector as claimed in claim 20, wherein the second gas electron multiplier layer is configured such that a distance between the second gas electron multiplier layer and the first gas electron multiplier layer ranges from 0.1 mm to 10 mm.

24. The digital imaging photodetector as claimed in claim 20, wherein a potential difference between the second gas electron multiplier layer and the first gas electron multiplier layer allows the second gas electron multiplier layer to operate in a proportion region.

25. The digital imaging photodetector as claimed in claim 20, wherein the third gas electron multiplier layer is configured such that a distance between the third gas electron multiplier layer and the second gas electron multiplier layer ranges from 0.1 mm to 10 mm.

26. The digital imaging photodetector as claimed in claim 20, wherein a potential difference between the third gas electron multiplier layer and the second gas electron multiplier layer allows the third gas electron multiplier layer to operate in a proportion region.

27. The digital imaging photodetector as claimed in claim 20, wherein the third gas electron multiplier layer is configured such that a distance between the third gas electron multiplier layer and the readout unit ranges from 0.1 mm to 10 mm.

28. The digital imaging photodetector as claimed in claim 20, wherein a potential difference between the third gas electron multiplier layer and the readout unit allows the third gas electron multiplier layer to operate in a proportion region.

29. The digital imaging photodetector as claimed in claim 20, wherein a voltage of 100V to 10000V is applied to each of the first to third gas electron multiplier layers in order to produce the electron avalanche.

30. The digital imaging photodetector as claimed in claim 1, wherein the readout unit comprises a micro printed circuit board (MPCB).

31. The digital imaging photodetector as claimed in claim 1, wherein the readout unit includes:

a resistive anode for receiving the multiplied electrons as an electrical signal from the gas electron multiplier;

an adhesive layer for bonding the resistive anode to X-axis strips;

the X-axis strips distributing and outputting an electrical signal input via the resistive anode along one axis;

an insulation layer for insulating the X-axis strips and Y-axis strips from each other; and the Y-axis strips distributing and outputting an electrical signal input via the resistive anode along another axis.

32. The digital imaging photodetector as claimed in claim 31, wherein the readout unit further comprises a support for supporting the resistive anode, the adhesive layer, the X-axis strips, the insulation layer, and the Y-axis strips.

33. The digital imaging photodetector as claimed in claim 31, wherein the resistive anode is formed of a material having high surface resistance, such as a Mylar film or polyimide (Kapton).

34. The digital imaging photodetector as claimed in claim 31, wherein the adhesive layer is formed to have a thickness of 10 μm to 100 μm.

35. The digital imaging photodetector as claimed in claim 31, wherein the X-axis strips are formed to have a width of 10 μm to 200 μm.

36. The digital imaging photodetector as claimed in claim 31, wherein the insulation layer is formed of a material having high surface resistance, such as a Mylar film or polyimide.

37. The digital imaging photodetector as claimed in claim 31, wherein the insulation layer is formed to have a thickness of 10 μm to 100 μm.

38. The digital imaging photodetector as claimed in claim 31, wherein the Y-axis strips are formed to have a width of 10 μm to 1000 μm.

39. The digital imaging photodetector as claimed in claim 1, wherein the readout unit comprises a screen (including P20, P22, P46) doped with a phosphor or fluorescent material, and recognizes and outputs planar coordinates by detecting light emitted upon occurrence of the electron avalanche in the gas electron multiplier.

40. The digital imaging photodetector as claimed in claim 1, wherein the readout unit recognizes and outputs planar coordinates by detecting, using a CCD camera, light emitted upon occurrence of the electron avalanche in the gas electron multiplier.

41. The digital imaging photodetector as claimed in claim 1, wherein the readout unit is configured by at least one selected from the group consisting of applicable specific integrated circuit (ASIC) readout electronics, resistive anode readout electronics, pad or strip anode electronics, delay-line anode readout electronics, microstrip gas chamber (MSGC) readout electronics, and scintillation readout electronics.

42. The digital imaging photodetector as claimed in claim 1, wherein the gas electron multiplier detector further comprises GEM spacers for defining outer walls of spaces between the photoelectric converter and the gas electron multiplier and between the gas electron multiplier and the readout unit.

43. The digital imaging photodetector as claimed in claim 42, wherein the GEM spacers allow the gas electron multiplier detector to be configured in the form of a rectangular or cylindrical post.

44. The digital imaging photodetector as claimed in claim 42, wherein the GEM spacers define the outer walls between adjacent ones of the photoelectric converter, the gas electron multiplier and the readout unit, and form a housing for the photoelectric converter, the gas electron multiplier and the readout unit by bonding connection surfaces thereof to each other using an adhesive.

45. The digital imaging photodetector as claimed in claim 42, wherein the GEM spacers include a main gas for ionization and a quenching gas filled therein, wherein the gases are sealed, or injected and discharged in either a gas sealing manner or a gas injecting-discharging manner.

46. The digital imaging photodetector as claimed in claim 42, wherein the GEM spacers are formed of one or two or more insulating materials selected from the group consisting of Mylar film, epoxy, flexy glass and G-10 to prevent an electric current from flowing between the GEM layers of the gas electron multiplier.

47. The digital imaging photodetector as claimed in claim 1, further comprising an incident-light control unit for controlling incident light and delivering the light to the gas electron multiplier detector.

48. The digital imaging photodetector as claimed in claim 47, wherein the incident-light control unit comprises at least one of a laser, an X-ray generator, a gamma-ray source, a variety of lenses, a variety of mirrors, an interferometer, and a diffractor.

49. The digital imaging photodetector as claimed in claim 1, further comprising an analyzer for analyzing and processing planar coordinates output from the gas electron multiplier detector.

50. The digital imaging photodetector as claimed in claim 49, wherein the analyzer comprises:

a data acquisition unit for receiving an output signal of the gas electron multiplier detector and analyzing planar coordinates according to the intensity of the output signal; and a personal computer for processing the planar coordinates analyzed by the data acquisition unit.

51. The digital imaging photodetector as claimed in claim 50, wherein the data acquisition unit comprises:

a pre-amplifier for amplifying the output signal of the gas electron multiplier detector;

a discriminator for eliminating noise from the amplified signal provided by the pre-amplifier;

a main-amplifier for amplifying the discriminated signal from the discriminator;

a scaler for scaling an output of the main-amplifier;

a multi-channel analyzer for performing amplification analysis of a pulse amplitude spectrum for the output of the pre-amplifier, and performing multiscaler analysis of a discrimination curve and a high-temperature (HT) plateau curve for the output of the main-amplifier to classify signals depending on the intensity of the signals and to recognize and output an energy distribution of the incident light;

a control unit for receiving an output of the multi-channel analyzer and controlling an operation of the discriminator; and a power supply unit for supplying power to the pre-amplifier under the control of the control unit.

52. The digital imaging photodetector as claimed in claim 49, further comprising a display unit for receiving an output of the analyzer and displaying the output.

53. The digital imaging photodetector as claimed in claim 52, wherein the display unit comprises at least one of a printer, a plotter, a computer screen and a liquid crystal screen.

* * * * *